(12) United States Patent
Terashima et al.

(10) Patent No.: US 9,908,413 B2
(45) Date of Patent: Mar. 6, 2018

(54) VEHICLE DISPLAY DEVICE

(71) Applicant: DENSO CORPORATION, Kariya, Aichi-pref. (JP)

(72) Inventors: Hiroaki Terashima, Okazaki (JP); Hiroyuki Nagino, Nishio (JP); Shota Nojiri, Chiryu (JP); Kenichi Hiura, Kariya (JP); Kazuyoshi Kohda, Kariya (JP); Yoshihiko Michihiro, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 89 days.

(21) Appl. No.: 14/782,051

(22) PCT Filed: Apr. 9, 2014

(86) PCT No.: PCT/JP2014/002021
§ 371 (c)(1),
(2) Date: Oct. 2, 2015

(87) PCT Pub. No.: WO2014/167846
PCT Pub. Date: Oct. 16, 2014

(65) Prior Publication Data
US 2016/0052392 A1    Feb. 25, 2016

(30) Foreign Application Priority Data

Apr. 11, 2013  (JP) .................................. 2013-083068
Mar. 21, 2014  (JP) .................................. 2014-059334

(51) Int. Cl.
  B60K 35/00         (2006.01)
  G01D 11/28         (2006.01)
(Continued)

(52) U.S. Cl.
  CPC .............. *B60K 35/00* (2013.01); *B60K 37/02* (2013.01); *G01D 11/28* (2013.01); *G01D 13/04* (2013.01);
(Continued)

(58) Field of Classification Search
  CPC ........ B60K 35/00; B60K 37/00; B60K 37/02; B60K 37/04; G01D 11/28; G01D 13/04; G01D 13/18; G02B 5/205; G02B 27/024
(Continued)

(56) References Cited

U.S. PATENT DOCUMENTS 5,440,428 A *  8/1995  Hegg ..................... B60K 37/02
                                                    345/7
6,204,906 B1 *  3/2001  Tannas, Jr. ............ G02F 1/1339
                                                    349/153
(Continued)

FOREIGN PATENT DOCUMENTS

JP      2003004493 A     1/2003
JP      2003255340 A     9/2003
(Continued)

OTHER PUBLICATIONS

International Search Report and Written Opinion (in Japanese with English Translation) for PCT/JP2014/002021, dated Jul. 15, 2014; ISA/JP.

*Primary Examiner* — William R Alexander
(74) *Attorney, Agent, or Firm* — Harness, Dickey & Pierce, P.L.C.

(57) ABSTRACT

A vehicle display device includes an indicator that luminously displays a display image on its screen by lighting and stops the luminous display of the display image by extinction, and a display panel that includes a light shielding part on a rear surface of the display panel. The light shielding part light-shields a surrounding part of a transmitting win- (Continued)

dow, through which an image light of the display image is transmitted to be capable of being visually recognized from a front side. A transmission region of a front surface of the display panel that is located at least on the front side of the transmitting window is occupied by a planar part that is formed in a flat surface shape along the screen, and a plurality of projecting surface parts that project from the planar part into a curved projecting surface shape. An area occupancy of the planar part at the transmission region is adjusted to be equal to or larger than an area occupancy of all the plurality of projecting surface parts at the transmission region.

14 Claims, 23 Drawing Sheets

(51) Int. Cl.
G01D 13/18 (2006.01)
B60K 37/02 (2006.01)
G01D 13/04 (2006.01)
G02B 5/20 (2006.01)
G02B 27/02 (2006.01)

(52) U.S. Cl.
CPC ............ *G01D 13/18* (2013.01); *G02B 5/205* (2013.01); *G02B 27/024* (2013.01); *B60K 2350/1064* (2013.01); *B60K 2350/206* (2013.01); *B60K 2350/2078* (2013.01); *B60K 2350/2086* (2013.01); *B60K 2350/2091* (2013.01); *B60K 2350/2095* (2013.01)

(58) Field of Classification Search
USPC .................................................. 359/601–604
See application file for complete search history.

(56) References Cited

U.S. PATENT DOCUMENTS

| | | | | |
|---|---|---|---|---|
| 6,281,788 | B1* | 8/2001 | Noll ..................... | B60K 35/00 313/510 |
| 6,979,094 | B1* | 12/2005 | Venkatram ............. | G01D 11/28 362/23.01 |
| 9,104,033 | B2* | 8/2015 | Lundvall ............ | G02B 27/2214 |
| 9,588,348 | B2* | 3/2017 | Park ............ | G02B 27/2214 |
| 2004/0027041 | A1* | 2/2004 | Nishikawa ............. | B60K 35/00 313/110 |
| 2008/0211652 | A1* | 9/2008 | Cope ..................... | B60K 35/00 340/461 |
| 2008/0232135 | A1* | 9/2008 | Kinder ................ | G02B 6/0053 362/615 |
| 2009/0231698 | A1* | 9/2009 | Hashimoto ........... | B60K 35/00 359/476 |
| 2010/0002412 | A1 | 1/2010 | Murasawa et al. | |
| 2010/0278480 | A1* | 11/2010 | Vasylyev ............... | G02B 3/005 385/33 |
| 2011/0176325 | A1* | 7/2011 | Sherman .............. | G02B 6/0018 362/551 |
| 2012/0262901 | A1* | 10/2012 | Ichihara ................ | B60K 35/00 362/23.18 |

FOREIGN PATENT DOCUMENTS

| | | |
|---|---|---|
| JP | 2006047271 A | 2/2006 |
| JP | 2008089479 A | 4/2008 |
| JP | 2008158380 A | 7/2008 |
| JP | 2010014551 A | 1/2010 |
| JP | 2011107077 A | 6/2011 |
| JP | 2012078108 A | 4/2012 |
| JP | 2012103047 A | 5/2012 |

* cited by examiner

VEHICLE DISPLAY DEVICE

CROSS REFERENCE TO RELATED APPLICATIONS

This application is a U.S. National Phase Application under 35 U.S.C. 371 of International Application No. PCT/JP2014/002021 filed on Apr. 9, 2014 and published in Japanese as WO 2014/167846 A1 on Oct. 16, 2014. This application is based on and claims the benefit of priority from Japanese Patent Application No. 2013-083068 filed on Apr. 11, 2013 and Japanese Patent Application No. 2014-059334 filed on Mar. 21, 2014. The entire disclosures of all of the above applications are incorporated herein by reference.

TECHNICAL FIELD

The present disclosure relates to a vehicle display device.

BACKGROUND ART

Conventionally, there is widely used a vehicle display device for transmitting the image light of a display image, which is luminously displayed on a screen by lighting of an indicator, through a display panel to be capable of being visually recognized from a front side thereof.

According to the configuration disclosed in, for example, Patent Document 1, the surrounding part of a transmitting window through which the image light is transmitted is shielded by a light shielding part on a rear side of the display panel, and an embossed surface to which the light source light is guided is formed on a rear surface of the display panel. As a result of such a configuration, at the time of lighting of the indicator that luminously displays the display image, the irregular reflection light of the light source light by the embossed surface is stronger than the image light passing through the boundary between the transmitting window and the light shielding part, so that the visual recognition from a front side of the boundary can be inhibited. At the time of extinguishing the light of the indicator when the luminous display of the display image is stopped, the external light entering from a front side of the display panel into the transmitting window is reflected by the screen of the indicator and is diffused by the embossed surface. On the other hand, the external light entering from the front side of the display panel into the surrounding part of the transmitting window is absorbed by the light shielding part of the surrounding part. As a result of the above diffusion and absorption, both the external light entering into the transmitting window, and the external light entering into the surrounding part of the transmitting window do not easily return to the front side. Accordingly, the visual recognition of the boundary between the transmitting window and the light shielding part from the front side can be inhibited. By this visual recognition inhibitory effect, the inner part and the surrounding part of the transmitting window can be displayed seamlessly with a sense of unity. As a result, the attractiveness of appearance as the vehicle display device can be enhanced.

PRIOR ART DOCUMENT

Patent Document

Patent Document 1: JP2003-4493A

However, according to the configuration disclosed in Patent Document 1, the image light of the display image entering from the rear side into the display panel at the time of lighting of the indicator is indistinctly visually-recognized when diffused by the embossed surface, and thus, the appearance attractiveness is deteriorated. Moreover, according to the configuration disclosed in Patent Document 1, at the time of extinguishing the light of the indicator, when the external light entering from the front side into the display panel is irregularly reflected by the embossed surface, the display panel is visually recognized in white, and the appearance attractiveness is thereby deteriorated.

SUMMARY OF INVENTION

The present disclosure addresses the above-described issues. Thus, it is an objective of the present disclosure to improve appearance attractiveness of a vehicle display device that displays a display image of an indicator through a transmitting window of a display panel.

In a first aspect of the present disclosure, a vehicle display device includes an indicator that luminously displays a display image on its screen by lighting and stops the luminous display of the display image by extinction, and a display panel that includes a light shielding part on a rear surface of the display panel. The light shielding part light-shields a surrounding part of a transmitting window through which an image light of the display image is transmitted to be capable of being visually recognized from a front side. A transmission region of a front surface of the display panel that is located at least on the front side of the transmitting window is occupied by a planar part that is formed in a flat surface shape along the screen, and a plurality of projecting surface parts that project from the planar part into a curved projecting surface shape. An area occupancy of the planar part at the transmission region is adjusted to be equal to or larger than an area occupancy of all the plurality of projecting surface parts at the transmission region.

Accordingly, both at the time of lighting and extinguishing of the indicator, the external light entering from the front side of the display panel into the transmitting window is reflected by the screen of the indicator, so that the external light enters into at least the transmission region of the display panel front surface on the front side of the transmitting window. In this case, the light entering into the transmission region is diffused by each projecting surface part having a curved projecting surface shape that projects from the planar part having a flat surface shape. Both at the time of lighting and extinguishing of the indicator, the external light entering from the front side of the display panel into the surrounding part of the transmitting window is absorbed by the light shielding part which light-shields this surrounding part. As a result of the diffusion and absorption, the external light entering into the transmitting window and the external light entering into the surrounding part of the transmitting window both do not easily return to the front side. Thus, the visual recognition of the boundary between the transmitting window and the light shielding part from the front side can be inhibited.

Moreover, at the transmission region of the display panel front surface, the area occupancy of the planar part is adjusted to be equal to or larger than the area occupancy of all the projecting surface parts. Consequently, the image light of the display image entering from the rear side into the display panel at the time of lighting of the indicator is diffused by each projecting surface part having a curved projecting surface shape, but can be transmitted straight through the planar part that has the area occupancy equal to or larger than these projecting surface parts and that is along the indicator screen, so as to be sharply visually-recognized. Furthermore, the external light, which has entered from the front side into the display panel at the time of extinguishing of the indicator, becoming the irregular reflection light due to the projecting surface parts is reduced in accordance with the area occupancy of these projecting surface parts equal to or smaller than the planar part. Thus, the display panel can be inhibited from being visually recognized in white.

As a result of the above, the sharp display at the time of lighting of the indicator as well as the display for inhibition of the visual recognition as a white color at the time of extinguishing of the indicator can also be achieved in addition to the seamless display at the time of lighting and extinguishing of the indicator. Thus, the appearance attractiveness can be improved.

In a second aspect of the present disclosure, a vehicle display device includes an indicator that luminously displays a display image on its screen by lighting and stops the luminous display of the display image by extinction, and a display panel that includes a light shielding part on a rear surface of the display panel. The light shielding part light-shields a surrounding part of a transmitting window through which an image light of the display image is transmitted to be capable of being visually recognized from a front side. A transmission region of a front surface of the display panel that is located at least on the front side of the transmitting window is occupied by a planar part that is formed in a flat surface shape along the screen, and a plurality of projecting surface parts that project from the planar part. Each of the plurality of projecting surface parts includes a portion that is inclined in a curved shape or planar shape relative to the planar part. An area occupancy of the planar part at the transmission region is adjusted to be equal to or larger than an area occupancy of all the plurality of projecting surface parts at the transmission region.

Accordingly, both at the time of lighting and extinguishing of the indicator, the external light entering from the front side of the display panel into the transmitting window is reflected by the screen of the indicator, so that the external light enters into at least the transmission region of the display panel front surface on the front side of the transmitting window. In this case, the light entering into the transmission region is diffused by each projecting surface part that includes a portion which projects from the planar part having a flat surface shape and which is inclined in a curved shape or planar shape relative to this planar part. On the other hand, both at the time of lighting and extinguishing of the indicator, the external light entering from the front side of the display panel into the surrounding part of the transmitting window is absorbed by the light shielding part which light-shields this surrounding part. As a result of the diffusion and absorption, the external light entering into the transmitting window and the external light entering into the surrounding part of the transmitting window both do not easily return to the front side. Accordingly, the visual recognition of the boundary between the transmitting window and the light shielding part from the front side can be inhibited.

Moreover, at the transmission region of the display panel front surface, the area occupancy of the planar part is adjusted to be equal to or larger than the area occupancy of all the projecting surface parts. Consequently, the image light of the display image entering from the rear side into the display panel at the time of lighting of the indicator is diffused by each projecting surface part having a portion which is inclined in a curved shape or planar shape relative to the planar part, but can be transmitted straight through the planar part that has the area occupancy equal to or larger than these projecting surface parts and that is along the indicator screen, so as to be sharply visually-recognized.

Furthermore, the external light, which has entered from the front side into the display panel at the time of extinguishing of the indicator, becoming the irregular reflection light due to the projecting surface parts is reduced in accordance with the area occupancy of these projecting surface parts equal to or smaller than the planar part. Thus, the display panel can be inhibited from being visually recognized in white.

As a result of the above, the sharp display at the time of lighting of the indicator as well as the display for inhibition of the visual recognition as a white color at the time of extinguishing of the indicator can also be achieved in addition to the seamless display at the time of lighting and extinguishing of the indicator. Thus, the appearance attractiveness can be improved.

In a third aspect of the present disclosure, the light shielding part which is non-transparent and darkly-colored light-shields a surrounding part of a semitransparent darkly-colored smoke part which is formed inside the transmitting window and through which the image light is transmitted.

At the time of lighting and extinguishing of the indicator having this characteristic, the external light entering into the semitransparent darkly-colored smoke part inside the transmitting window is reflected by the screen of the indicator to be diffused by each projecting surface part. On the other hand, the external light entering into the surrounding part of the transmitting window is absorbed by the non-transparent darkly-colored light shielding part around the transmitting window. As a result of the diffusion and absorption, the external light entering into the transmitting window and the external light entering into the surrounding part of the transmitting window do not easily return to the front side, and moreover, a color difference is not easily made between at the inner part and the surrounding part of the transmitting window. Accordingly, a visual recognition inhibition effect can be increased on the boundary between the transmitting window and the light shielding part, which can thereby contribute to the improvement in appearance attractiveness.

In a fourth aspect of the present disclosure, the plurality of projecting surface parts are provided side by side at a constant pitch in at least a part of the transmission region.

As a result of this characteristic, at the transmission region where the projecting surface parts are arranged side by side with each other at the constant pitch, the position of diffusion of the image light by the projecting surface part as well as the position of irregular reflection of the external light by the projecting surface part are the positions that are determined regularly in accordance with this pitch. Accordingly, the sharp display and the display for inhibition of the visual recognition as a white color can be achieved equally at an arbitrary position of the transmission region, which can thereby contribute to the improvement in appearance attractiveness.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
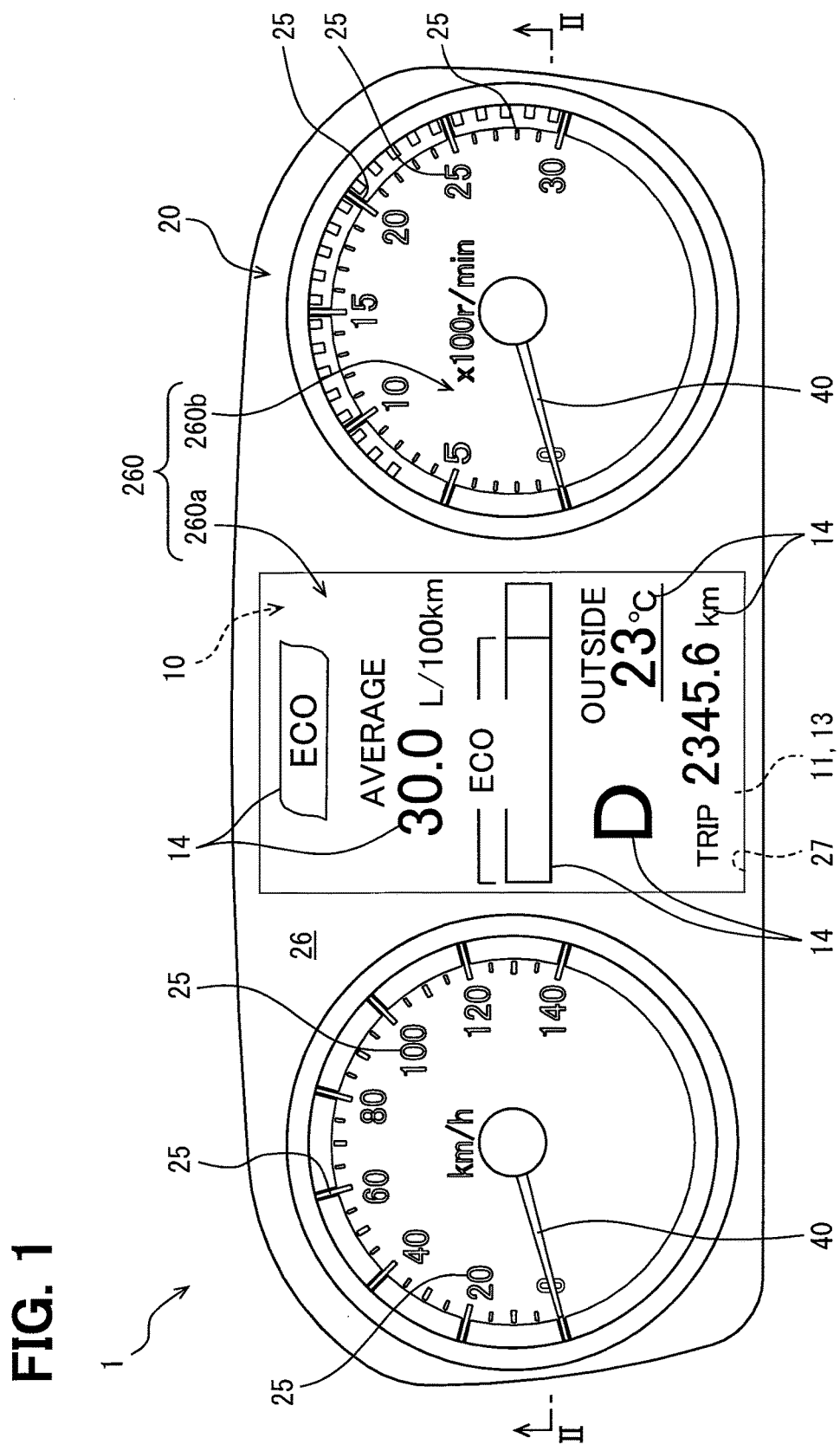
FIG. 1 is a front view illustrating a vehicle display device in accordance with a first embodiment.

Embodiments will be described below in reference to the drawings. Using the same reference numeral for corresponding components throughout the embodiments, a repeated description may be omitted. In a case of description of only a part of configuration in each embodiment, a configuration in another embodiment explained ahead of the embodiment can be applied to the other part of the configuration. In addition to a combination of the configurations indicated in the descriptions of the embodiments, the configurations in the embodiments can be partially combined together even without explanation thereof as long as this combination functions.

(First Embodiment)

As illustrated in FIG. 1, a vehicle display device 1 of a first embodiment is a combination meter that displays vehicle information to an occupant seated on a seat in a vehicle compartment, and is disposed at an instrument panel in the vehicle compartment. A "front side" of the device 1 indicates a direction in which the vehicle information is displayed to the occupant on the seat, i.e., a visually-recognizing side by the occupant. A "rear side" of the vehicle display device 1 indicates an opposite direction from the direction of display to the occupant on the seat.

Figure 2:
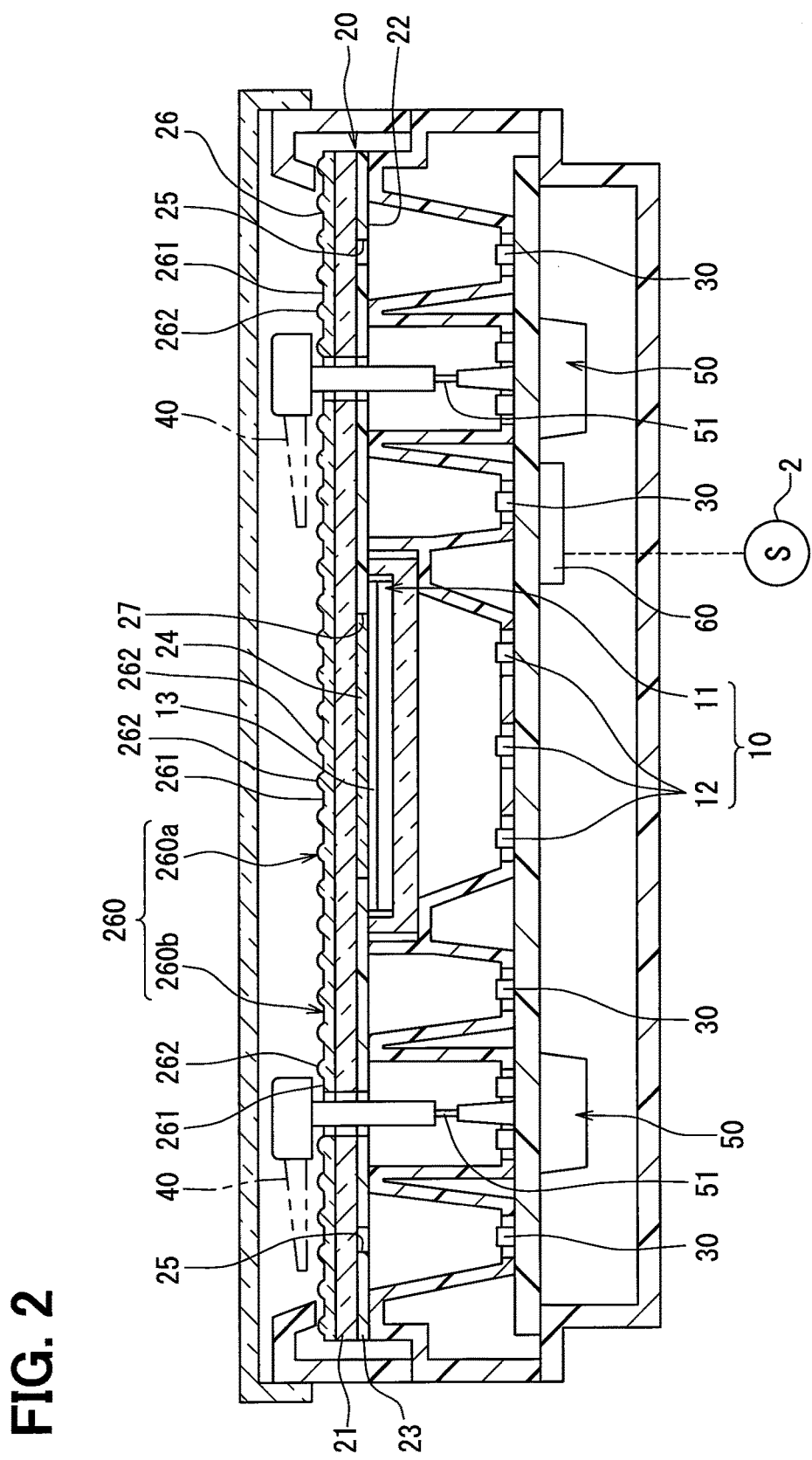
FIG. 2 is a cross-sectional view taken along a line II-II in FIG. 1.

A basic configuration of the device 1 will be described below. As illustrated in FIGS. 1 and 2, the device 1 includes an indicator 10, a display panel 20, a designed light source 30, a pointer 40, a drive source 50, and a control circuit 60.

The indicator 10 includes a display panel 11 and a backlight 12. In the first embodiment, the display panel 11 is a TFT liquid crystal panel, and is disposed with its screen 13 directed toward the front side. By drive of pixels which are arrayed in a matrix to constitute the screen 13, the display panel 11 forms a display image 14 as an image illustrated in FIG. 1. The display image 14 is displayed from among pieces of vehicle information (e.g., mileage, temperature, shift range, traveling mode, travel distance) necessary for driving the vehicle, with their types fixed or switched.

As illustrated in FIG. 2, the backlight 12 is made of light emitting elements such as light emitting diodes (LED) in combination, and is disposed to overlap with the display panel 11 on the rear side of the display panel 11. At the same time as lighting of the backlight 12, the display image 14 (see FIG. 1) is formed on the screen 13, so that the screen 13 is transmissively illuminated, and the display image 14 is thereby luminously displayed. On the other hand, at the same time as extinguishing of the backlight 12, the screen 13 is blacked out, so that the luminous display of the display image 14 is stopped.

Figure 3:
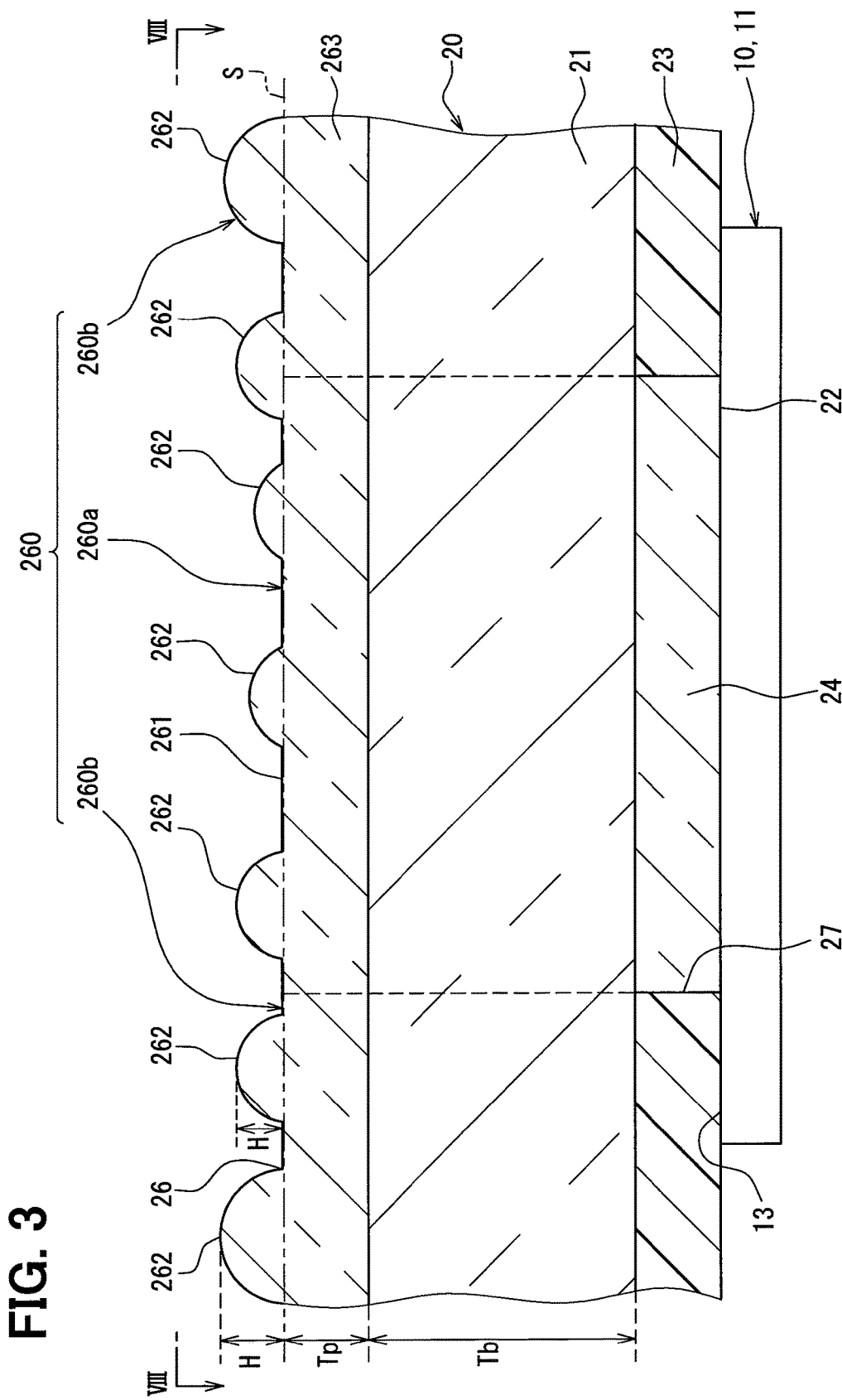
FIG. 3 is an enlarged cross-sectional view illustrating a main part of FIG. 2.

As illustrated in FIGS. 2 and 3, the display panel 20 is disposed to overlap with the display panel 11 on the front side of the screen 13 of the display panel 11 of the indicator 10. The display panel 20 is formed in a plate-shape with a translucent substrate 21 made from, for example, polycarbonate resin, as its main component. A light shielding part 23 and a smoke part 24 are provided on a rear surface 22 of the display panel 20. The light shielding part 23 is made by stacking an opaque layer such as acrylic resin, vinyl chloride resin, or polyester resin, colored black as a dark color on the translucent substrate 21 by printing or the like. The light shielding part 23 is not provided at the central part of the display panel 20, thereby defining a rectangular transmitting window 27. The smoke part 24 is made by stacking a semitransparent layer such as acrylic resin, vinyl chloride resin, or polyester resin, colored gray as a dark color on the translucent substrate 21 by printing or the like. The smoke part 24 is formed to fill up the entire inner portion of the light shielding part 23. As a result of the above-described configuration, the image light of the display image 14 at the time of luminous display is transmitted through the smoke part 24 inside the transmitting window 27 to be capable of being visually recognized from the occupant on the front side (see FIG. 1). In this case, the image light is shielded by the light shielding part 23 at the surrounding part of the transmitting window 27 around the smoke part 24, so that the display image 14 is substantially not displayed.

The light shielding part 23 is partly not provided also around the transmitting window 27 as in FIG. 2, thereby forming display designs 25 into scale or character-shapes as in FIG. 1. As illustrated in FIGS. 2 and 3, as opposed to a first front surface region 260a of a front surface 26 of the display panel 20 that is located on the front side of the transmitting window 27, a second front surface region 260b for transmitting the image light of each display design 25 to be capable of being visually recognized from the occupant on the front side is set at the entire surrounding part of this first front surface region 260a. In this first embodiment, a transmission region 260 is constituted of the first front surface region 260a and the second front surface region 260b, i.e., of the entire front surface 26.

As illustrated in FIG. 2, the designed light source 30 is a light emitting element such as a light emitting diode (LED), and there are more than one designed light source 30 arranged away from the light shielding part 23 at the positions on the rear side of the second front surface region 260b. Each designed light source 30 emits a light source light by its lighting to transmissively illuminate the display designs 25, so that these display designs 25 are luminously displayed. On the other hand, by extinguishing its light, each designed light source 30 stops the luminous display of the display designs 25.

As illustrated in FIGS. 1 and 2, the pointer 40 is formed in a transparent elongated needle-shape from, for example, acrylic resin, and the pair of pointers 40 are arranged away from each other on the front side of the second front surface region 260b. Each pointer 40 indicates its corresponding display design 25 transmitted through the second front surface region 260b in accordance with the rotation position. Accordingly, the pointer 40 provides the occupant with predetermined vehicle information (e.g., vehicle speed, engine speed) necessary for the vehicle operation.

As illustrated in FIG. 2, the drive source 50 is an electric actuator such as a stepping motor, and the pair of drive sources 50 are arranged away from the light shielding part 23 at the positions on the rear side of the second front surface region 260b. Each drive source 50 rotates its corresponding pointer 40 by a drive shaft 51 passing through the display panel 20 between its front and rear sides.

The control circuit 60 is an electronic circuit such as a microcomputer, and is disposed at a predetermined position on the rear side of the display panel 20. The control circuit 60 is electrically connected to the display panel 11, the backlight 12, and each designed light source 30. The control circuit 60 is also communicably connected to a predetermined sensor or switch of the vehicle. The control circuit 60 controls the drive of the constituent pixels of the screen 13 and the lighting and extinguishing of the backlight 12 and each designed light source 30 based on an output signal from the sensor or switch of the vehicle. Particularly, when a light switch 2 of the vehicle is operated to the lighting position of a vehicle width light or headlight and a lighting signal is thereby outputted, the control circuit 60 forms the display image 14 on the screen 13, and lights up the backlight 12 and each designed light source 30. On the other hand, when the light switch 2 of the vehicle is operated to the extinguishing position and an extinguishing signal is thereby outputted, the control circuit 60 blacks out the screen 13 and extinguishes the backlight 12 and each designed light source 30.

A detailed configuration of the display panel 20 will be explained below.

Figure 8:
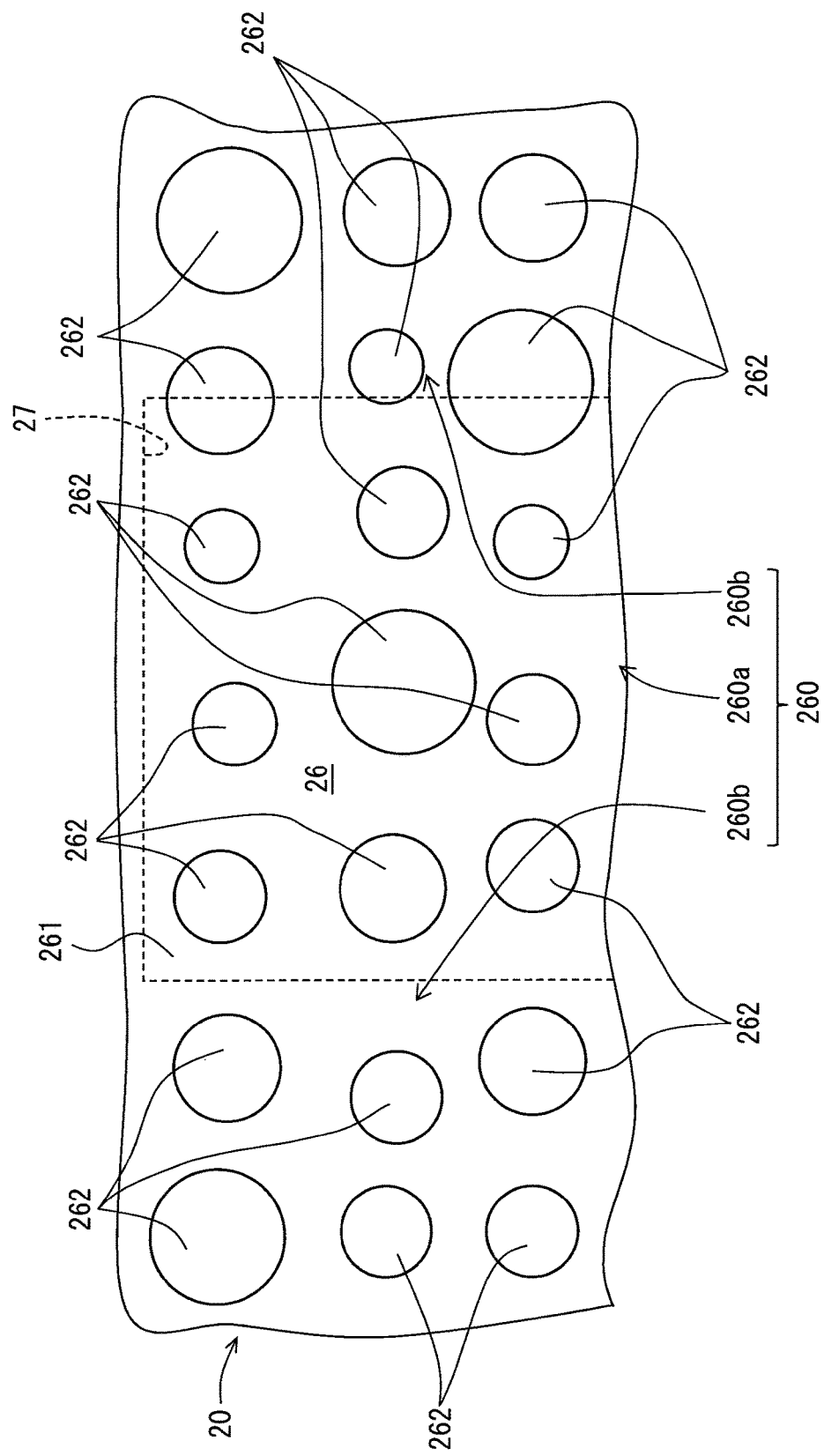
FIG. 8 is a diagram viewed from arrowed lines VIII-VIII in FIG. 3.

As illustrated in FIGS. 2, 3, and 8, the transmission region 260 of the front surface 26 of the display panel 20 is occupied by a planar part 261 and projecting surface parts 262. The planar part 261 is formed in a shape of a flat surface that is substantially parallel to the screen 13 of the display panel 11 located on its rear side along the screen 13. Each projecting surface part 262 is adjacent to the planar part 261 therearound, and projects toward the front side from the adjacent planar part 261. Each projecting surface part 262 is formed into a curved projecting surface shape such as a spherical surface shape or aspheric surface shape. As a result of such a shape, each projecting surface part 262 ensures at nearly its entire part a portion that is inclined in a curved shape relative to the surrounding planar part 261 to be directed toward the front side, more specifically, a portion that is inclined in a curved projecting shape to be directed toward the front side. The contour shape of each projecting surface part 262 viewed from its front side may be a shape of a true circle as in FIG. 8, or although not shown, may be a shape of an ellipse or another shape.

As illustrated in FIG. 3, the planar part 261 and each projecting surface part 262 are configured of a light transmitting layer 263 which is stacked on the translucent substrate 21. Specifically, the planar part 261 is formed on the surface of a part of the light transmitting layer 263 that has substantially the same thickness Tp. On the other hand, the projecting surface parts 262 are formed on the surface of more than one part of the light transmitting layer 263 that has an irregular projection height H in addition to the thickness Tp. The thickness Tb of the translucent substrate 21 is set at a predetermined value, for example, from 300 μm to 1 mm, whereas the thickness Tp of the light transmitting layer 263 where the planar part 261 is formed is set at a predetermined value such as 10 μm. On the other hand, the projection height H of each projecting surface part 262 may fall within a range such as from 1 μm to 20 μm, particularly, within a range from 1 μm to 10 μm. In FIGS. 3 and 8, the components that require explanation are illustrated particularly with emphasis added, and thus a size relationship between the components is different from the actual relationship.

At the transmission region 260 of the first embodiment, the planar part 261 is provided around the projecting surface parts 262 which are arranged side by side with each other with an irregular pitch. Under this configuration, by setting an average pitch of the projecting surface parts 262 at the transmission region 260 at a predetermined value, for example, from 1 μm to 100 μm, the area occupancies of the parts 261, 262 at the transmission region 260 are adjusted to have a predetermined relationship.

Figure 4:
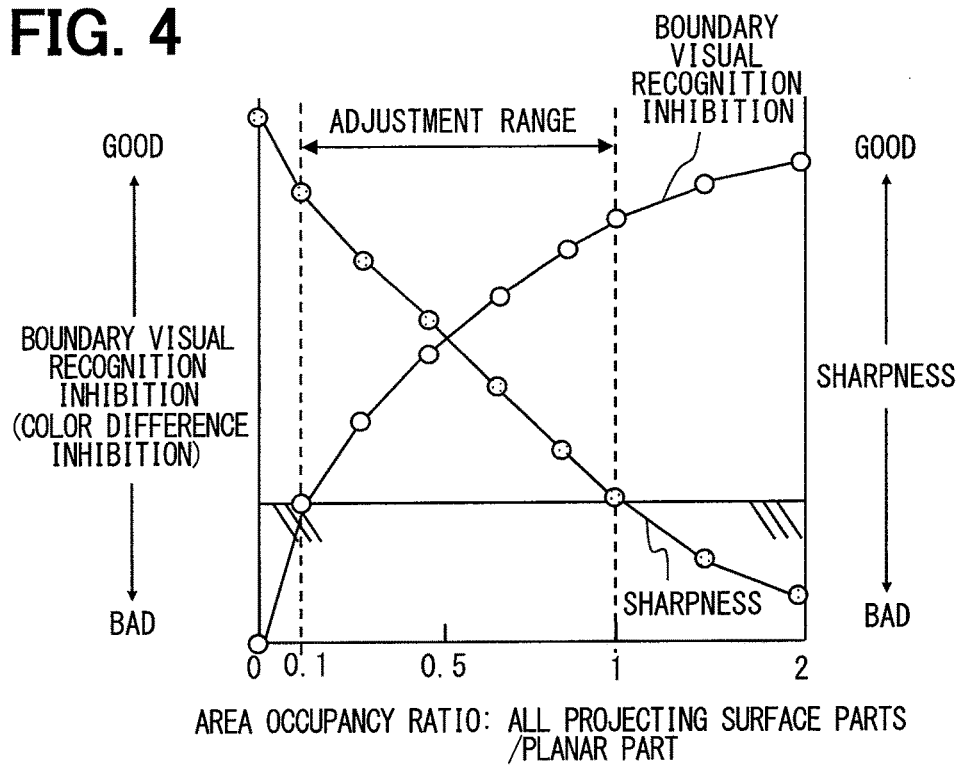
FIG. 4 is a graph illustrating characteristics, an operation and effect of the first embodiment.
Figure 5:
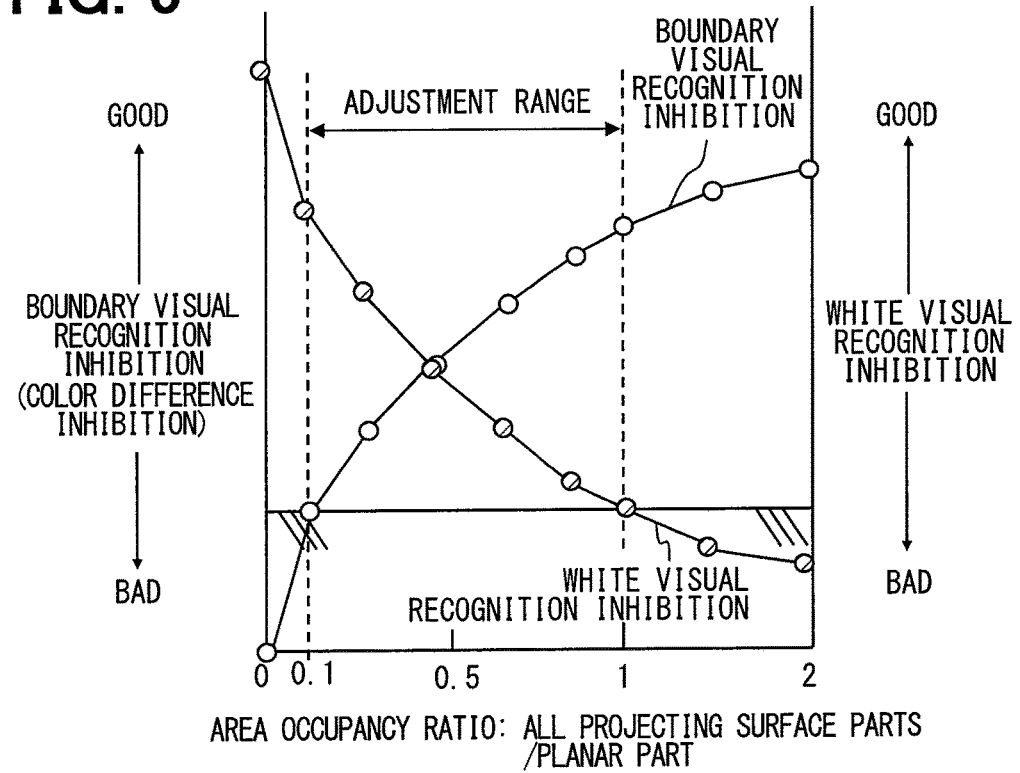
FIG. 5 is a graph illustrating the characteristics, the operation and effect of the first embodiment.

Specifically, the average pitch of the projecting surface parts 262 may be set in a range from 1 μm to 30 μm for avoiding the visual recognition of the contour of each projecting surface part 262 or in a range from 30 μm to 100 μm for increasing the diffusion efficiency of external light by the projecting surface parts 262, within the above-described range from 1 μm to 100 μm, for example. Accordingly, as illustrated in FIGS. 4 and 5, the area occupancy of the planar part 261 at the transmission region 260 is adjusted to be equal to or larger than the area occupancy of all the projecting surface parts 262 at the transmission region 260. This is realized by setting a ratio of the area occupancy of all the projecting surface parts 262 to the area occupancy of the planar part 261 at a value of 1 or smaller. The ratio of the area occupancy of all the projecting surface parts 262 to the area occupancy of the planar part 261 may be set at a predetermined value from 0.1 to 1. Furthermore, the ratio of the area occupancy of all the projecting surface parts 262 to the area occupancy of the planar part 261 may be set at a predetermined value from 0.2 to 0.5. The upper limit of the ratio of the area occupancy of all the projecting surface parts 262 to the area occupancy of the planar part 261 is set to be capable of achieving a state excellent in terms of the sharp display as illustrated in FIG. 4 and the display for inhibition of the visual recognition as a white color, as illustrated in FIG. 5. On the other hand, the lower limit of the ratio of the area occupancy of all the projecting surface parts 262 to the area occupancy of the planar part 261 is set to be capable of achieving a state excellent in terms of the seamless display by boundary visual recognition inhibition as illustrated in FIGS. 4 and 5.

When a reference plane S, on which the planar part 261 is located, is assumed as illustrated in FIG. 3, the ratio of the total surface area of the planar part 261 to the area in the outline of the transmission region 260 on the reference plane S is referred to as an area occupancy of the planar part 261. Similarly, when the reference plane S is assumed, the ratio of the sum total of the areas in the outlines of the projecting surface parts 262 to the area in the outline of the transmission region 260 on the reference plane S is referred to as an area occupancy of all the projecting surface parts 262. An area occupancy based on these definitions will also be used in second to seventh embodiments and modifications explained later in full detail.

The light transmitting layer 263, on which the projecting surface parts 262 are provided with an irregular pitch and a predetermined area occupancy as described above, is formed by, for example, printing or painting on the translucent substrate 21. Alternatively, the planar part 261 and each projecting surface part 262 may be formed by, for example, grinding work or laser machining on the translucent substrate 21 without forming such a light transmitting layer 263.

Operation and effects of the above-described first embodiment will be described below.

Figure 6:
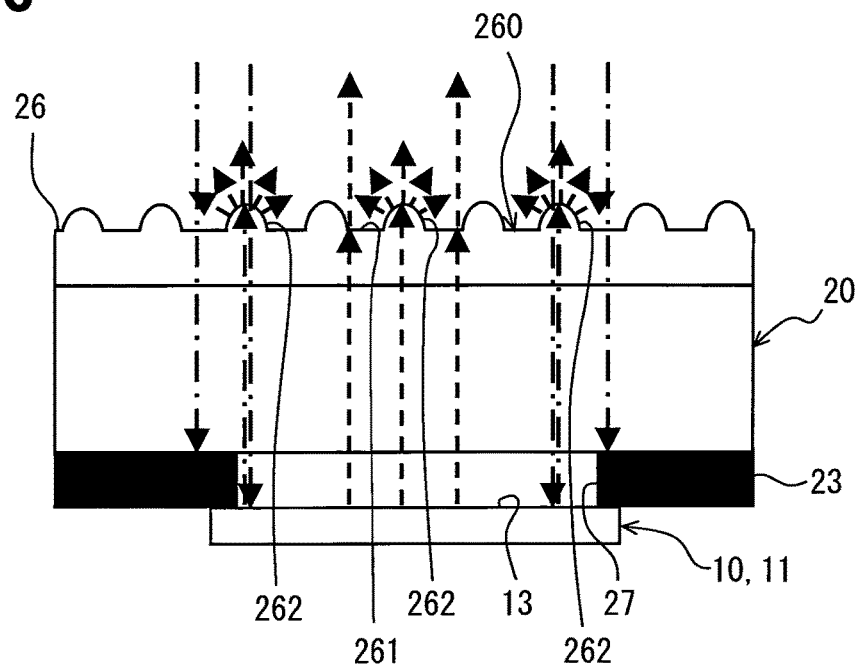
FIG. 6 is a schematic view illustrating the characteristics of the first embodiment.
Figure 7:
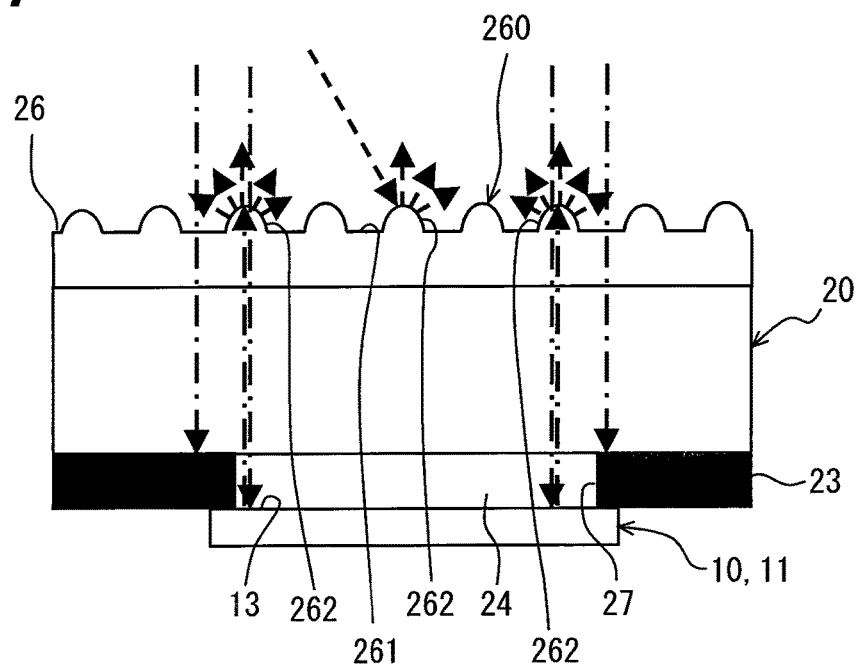
FIG. 7 is a schematic view illustrating the characteristics of the first embodiment.

As indicated by arrowed alternate long and short dash lines in FIGS. 6 and 7, both at the time of lighting and extinguishing of the backlight 12, the external light entering from the front side of the display panel 20 into the transmitting window 27 is reflected by the screen 13 of the display panel 11. Accordingly, the external light enters into at least the transmission region 260 of the display panel front surface 26 on the front side of the transmitting window 27. In this case, the light entering into the transmission region 260 is diffused by each projecting surface part 262 having a curved projecting surface shape that includes a portion which projects from the planar part 261 having a flat surface shape and which is inclined in a curved shape relative to this planar part 261. As indicated by the arrowed alternate long and short dashes lines in FIGS. 6 and 7, both at the time of lighting and extinguishing of the backlight 12, the external light entering from the front side of the display panel 20 into the surrounding part of the transmitting window 27 is absorbed by the light shielding part 23 which light-shields this surrounding part. As a result of the diffusion and absorption, the external light entering into the transmitting window 27 and the external light entering into the surrounding part of the transmitting window 27 both do not easily return to the front side. Thus, the boundary between the transmitting window 27 and the light shielding part 23 can be inhibited from being visually recognized from the front side (see FIGS. 4 and 5).

Moreover, at the transmission region 260 of the display panel front surface 26, the area occupancy of the planar part 261 is adjusted to be equal to or larger than the area occupancy of all the projecting surface parts 262. As a result, as indicated by arrowed short dashes lines in FIG. 6, the image light of the display image 14 entering from the rear side into the display panel 20 at the time of lighting of the backlight 12 is diffused by each projecting surface part 262 having a curved projecting surface shape that includes a portion inclined in a curved shape relative to this planar part 261. However, the image light of the display image 14 in this case can be transmitted straight through the planar part 261 that has the area occupancy equal to or larger than these projecting surface parts 262 and that is along the screen 13, so as to be sharply visually-recognized (see FIG. 4). As indicated by an arrowed short dashes line in FIG. 7, the external light, which has entered from the front side into the display panel 20 at the time of extinguishing of the backlight 12, becoming the irregular reflection light due to the projecting surface parts 262 is reduced in accordance with the area occupancy of these projecting surface parts 262 equal to or smaller than the planar part 261. Accordingly, the display panel 20 can be inhibited from being visually recognized in white (see FIG. 5).

In the first embodiment as described above, the sharp display at the time of lighting of the backlight 12 as well as the display for inhibition of the visual recognition as a white color at the time of extinguishing of the backlight 12 can also be achieved in addition to the seamless display at the time of lighting and extinguishing of the backlight 12. Thus, the appearance attractiveness can be improved.

As indicated by the arrowed alternate long and short dash lines in FIGS. 6 and 7, at the time of lighting and extinguishing of the backlight 12, the external light entering into the semitransparent darkly-colored smoke part 24 inside the transmitting window 27 is reflected by the screen 13 to be diffused by each projecting surface part 262. On the other hand, the external light entering into the surrounding part of the transmitting window 27 is absorbed by the non-transparent darkly-colored light shielding part 23 around the transmitting window 27. As a result of the diffusion and absorption, the external light entering into the transmitting window 27 and the external light entering into the surrounding part of the transmitting window 27 do not easily return to the front side, and moreover, a color difference (see FIGS. 4 and 5) is not easily made between at the inner part and the surrounding part of the transmitting window 27. Accordingly, a visual recognition inhibition effect can be increased on the boundary between the transmitting window 27 and the light shielding part 23, which can thereby contribute to the improvement in appearance attractiveness.

In addition, as indicated by the arrowed alternate long and short dash lines in FIGS. 6 and 7, at the time of lighting and extinguishing of the backlight 12, the external light entering into the transmitting window 27 is reflected by the screen 13 to be diffused by each projecting surface part 262, whereas the external light entering into the surrounding part of the transmitting window 27 is absorbed by the light shielding part 23, which defines the display design 25. As a result of the diffusion and absorption, the visual recognition of the boundary between the transmitting window 27 and the light shielding part 23 can be inhibited (see FIGS. 4 and 5). Consequently, the luminous display of the display image 14 by the transmission of the image light inside the transmitting window 27 and the luminous display of the display designs 25 by the transmission of the light source light around the transmitting window 27 can be achieved seamlessly, which can thereby contribute to the improvement in appearance attractiveness.

(Second Embodiment)

Figure 9:
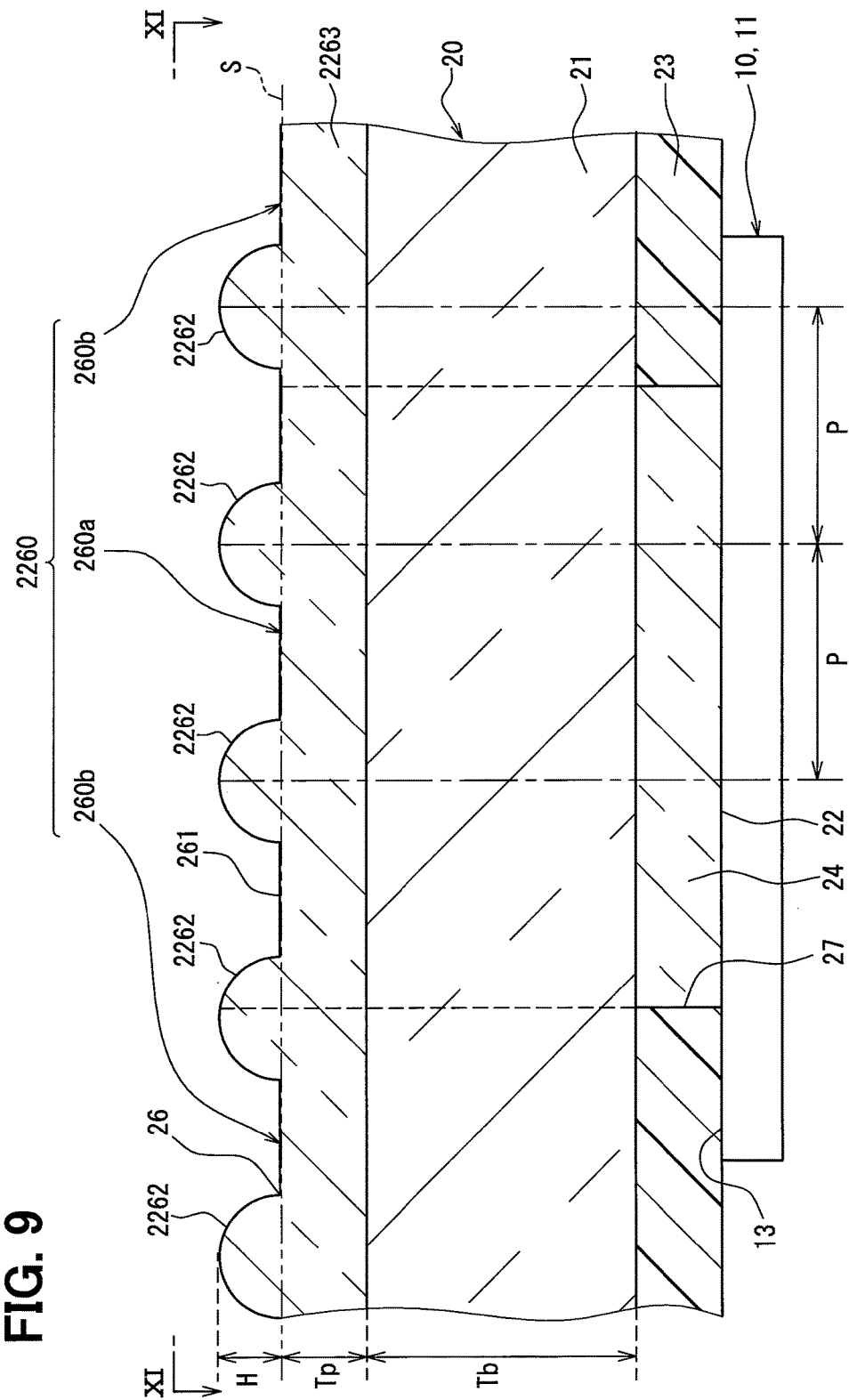
FIG. 9 is an enlarged cross-sectional view corresponding to FIG. 3 and illustrating a main part of a vehicle display device in accordance with a second embodiment.
Figure 10:
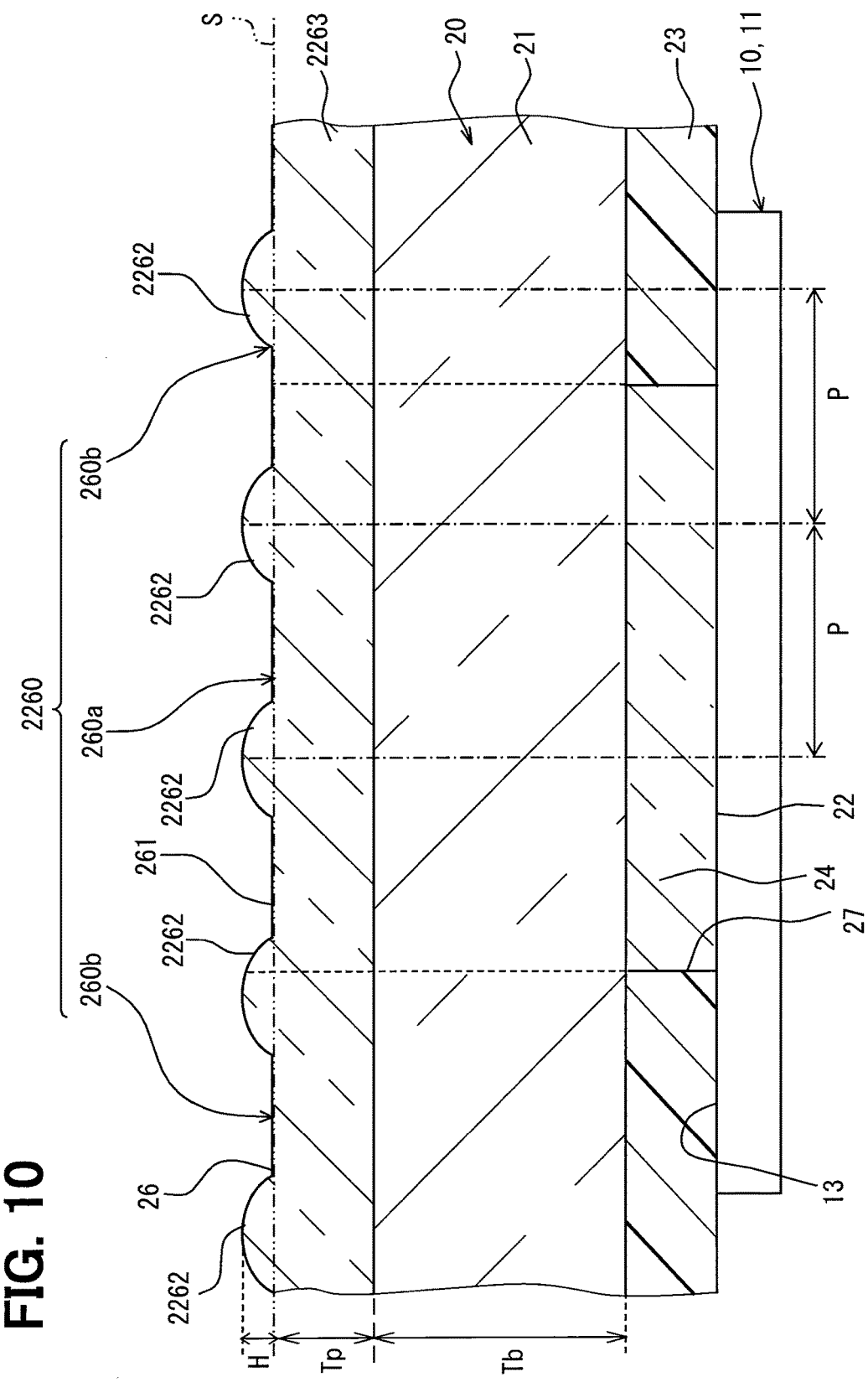
FIG. 10 is an enlarged cross-sectional view corresponding to FIG. 3 and illustrating an example different from FIG. 9 in the second embodiment.

As illustrated in FIG. 9, a second embodiment is a modification to the first embodiment. In the second embodiment, projecting surface parts 2262, each having a curved projecting surface shape that includes a portion inclined in a curved shape relative to a planar part 261, are formed at more than one position on the surface of a light transmitting layer 2263 having substantially the same projection height H in addition to the thickness Tp. The thickness Tb of a translucent substrate 21 is set at a predetermined value, for example, from 300 μm to 1 mm, whereas the projection height H of each projecting surface part 2262 may be set at a predetermined value, for example, from 1 μm to 20 μm, particularly at a predetermined value from 1 μm to 10 μm. Therefore, the projecting mode of each projecting surface part 2262 based on such a projection height H can be a mode illustrated in FIG. 10. In FIGS. 9 and 10, and drawings in third to seventh embodiments and modifications explained later in full detail, the components that require explanation are also illustrated particularly with emphasis added, and thus a size relationship between the components is different from the actual relationship.

Figure 11:
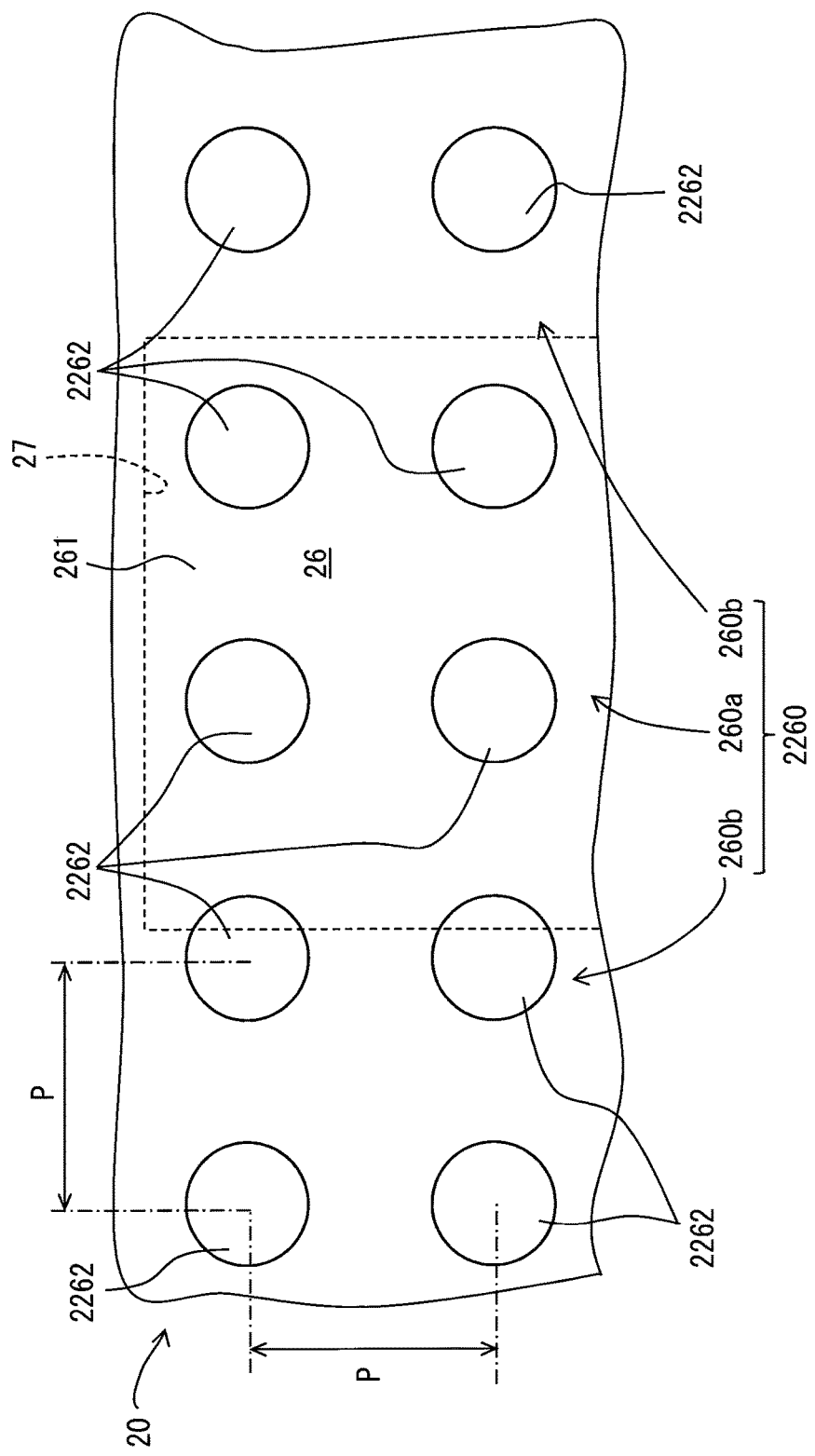
FIG. 11 is a diagram viewed from arrowed lines XI-XI in FIG. 9.

As illustrated in FIGS. 9 to 11, at a transmission region 2260 of the second embodiment, the planar part 261 is provided around the projecting surface parts 2262 arranged side by side with each other with a constant pitch P. As illustrated in FIG. 11, the pitch P is set at a value that is constant and the same as each other, in each of a horizontal direction (right-left direction in FIG. 11) and a vertical direction (up-down direction in FIG. 11) in the vehicle on a horizontal surface. Under such a configuration, by setting the pitch P of the projecting surface parts 2262 on the entire transmission region 2260 at a predetermined value, for example, from 1 μm to 100 μm, the area occupancies of the parts 261, 2262 at this transmission region 2260 are adjusted similarly to the first embodiment. Accordingly, in addition to the seamless display at the time of lighting and extinguishing of a backlight 12, the sharp display at the time of lighting of the backlight 12 as well as the display for inhibition of the visual recognition as a white color at the time of extinguishing of the backlight 12 can also be achieved. Thus, the appearance attractiveness can be improved. In conformity with the first embodiment, the pitch P can be set in a range from 1 μm to 30 μm for avoiding the visual recognition of the contour of each projecting surface part 2262 or in a range from 30 μm to 100 μm for increasing the diffusion efficiency of external light by each projecting surface part 2262.

In the second embodiment, at the transmission region 2260 where the projecting surface parts 2262 are arranged side by side with each other at the constant pitch P, the position of diffusion of the image light by each projecting surface part 2262 as well as the position of irregular reflection of the external light by each projecting surface part 2262 are the positions that are determined regularly in accordance with this pitch P. Accordingly, the sharp display and the display for inhibition of the visual recognition as a white color can be achieved equally at an arbitrary position of the transmission region 2260, which can thereby contribute to the improvement in appearance attractiveness.

The light transmitting layer 2263, on which the projecting surface parts 2262 are arranged with the constant pitch P and a predetermined area occupancy as described above, is formed by, for example, shape forming of the translucent substrate 21 or printing on the translucent substrate 21. In addition, the planar part 261 and the projecting surface parts 2262 may be formed by, for example, performing grinding work or laser machining on the translucent substrate 21 without forming such a light transmitting layer 2263.

(Third Embodiment)

Figure 12:
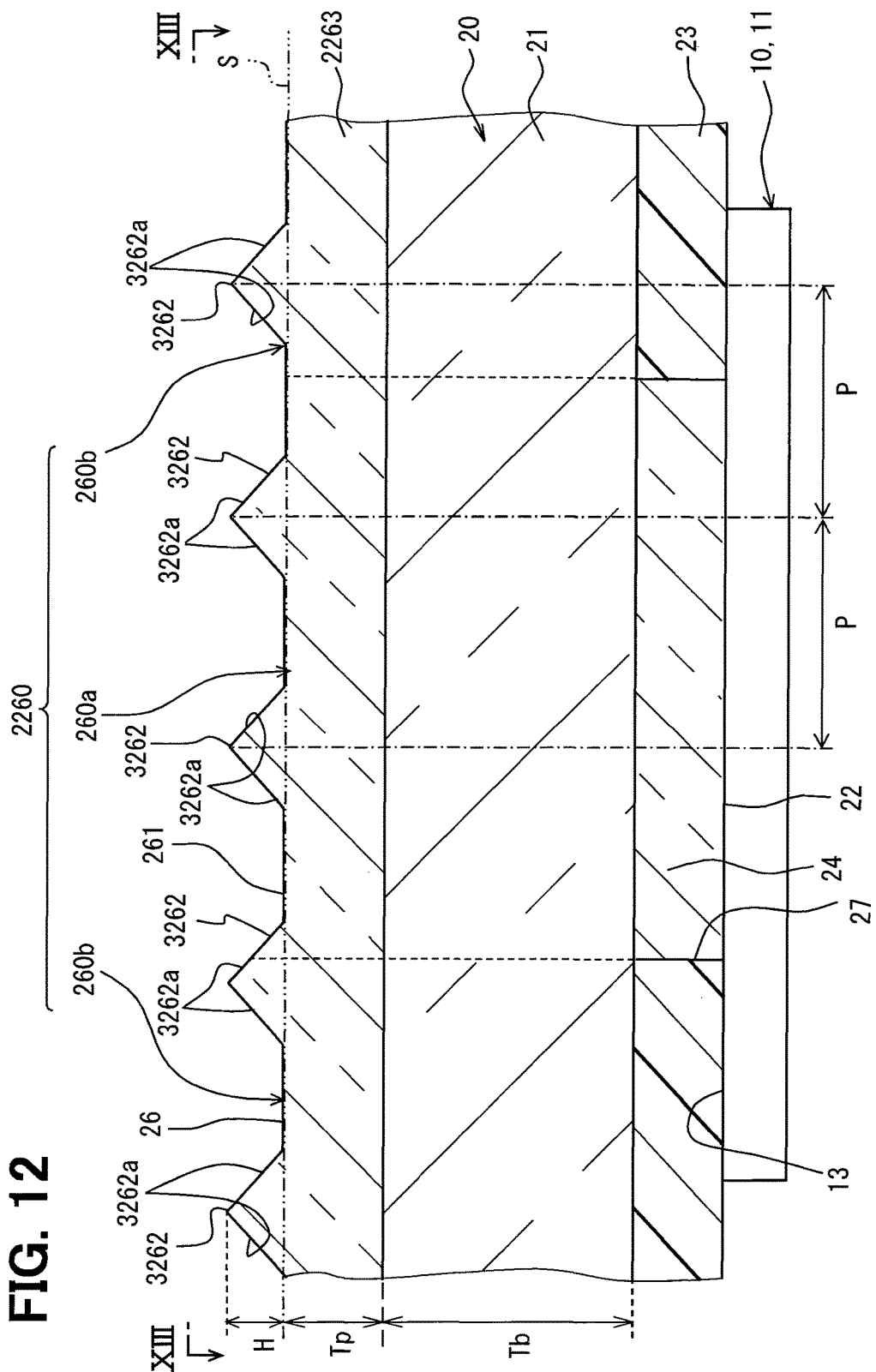
FIG. 12 is an enlarged cross-sectional view corresponding to FIG. 3 and illustrating a main part of a vehicle display device in accordance with a third embodiment.
Figure 13:
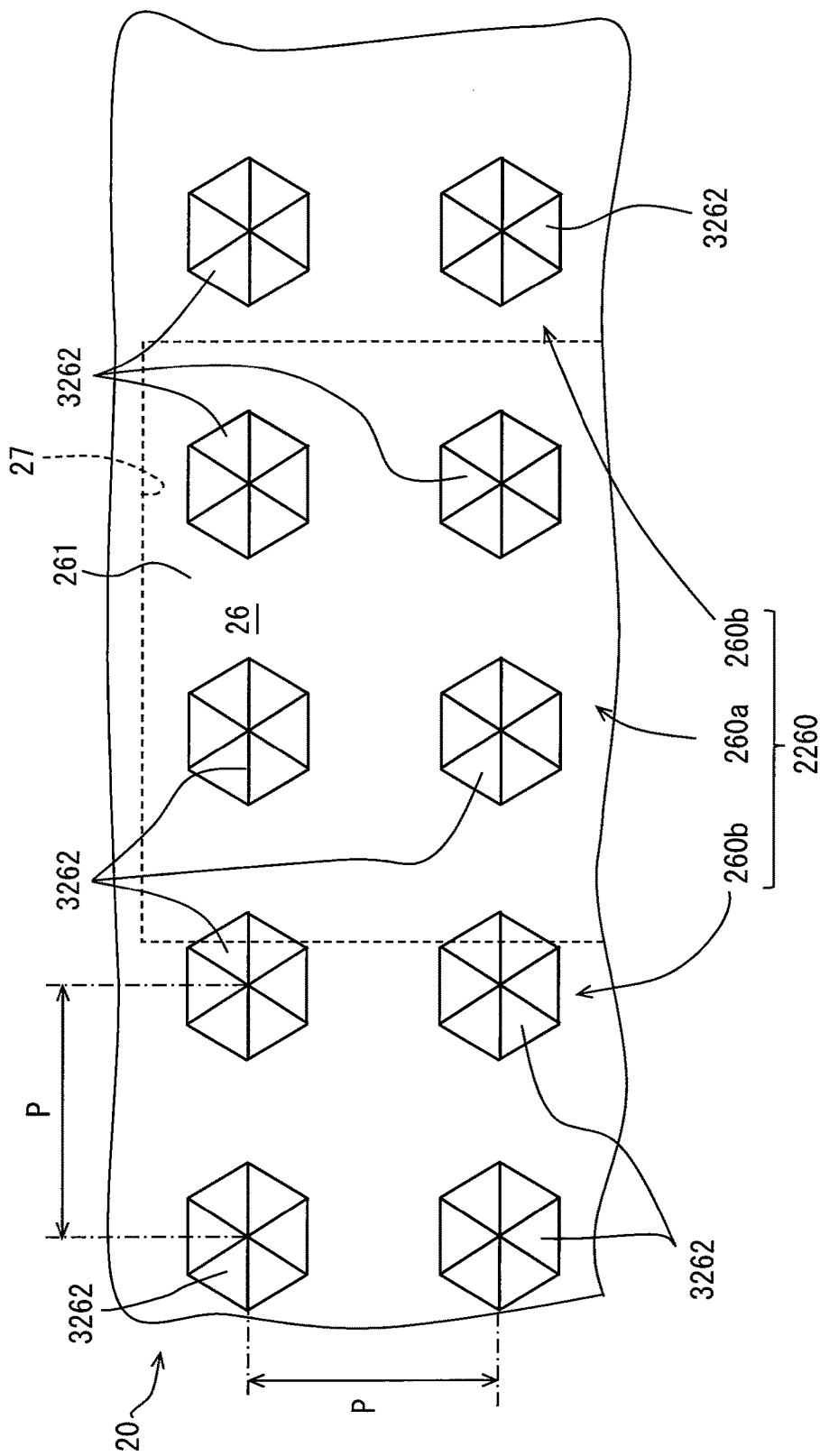
FIG. 13 is a diagram viewed from arrowed lines XIII-XIII in FIG. 12.

As illustrated in FIGS. 12 and 13, a third embodiment is a modification to the second embodiment. Each projecting surface part 3262 of the third embodiment is formed into a pyramidal surface shape that is pointed toward the front side, particularly, in the example in FIGS. 12 and 13, into a polygonal pyramid surface shape whose outline shape viewed from the front side is a hexagon. As a result of such a shape, each projecting surface part 3262 ensures a lateral surface portion 3262*a* that is inclined in a planar shape relative to a planar part 261 therearound and is directed to the front side as illustrated in FIG. 12. Instead of a hexagon as in FIG. 12, the outline shape of each projecting surface part 3262 viewed from the front side may be, although not shown, a polygonal shape such as a triangle, or a shape of a true circle or an ellipse.

In this third embodiment as well, the area occupancy of the planar part 261 at the transmission region 2260 is adjusted to be equal to or larger than the area occupancy of all the projecting surface parts 3262 at the transmission region 2260, similar to the first embodiment. Accordingly, in the third embodiment as well, the operation and effects described in the first and second embodiments can be produced similarly using the function of each projecting surface part 3262 having the lateral surface portion 3262*a* that is inclined in a planar shape relative to the planar part 261.

(Fourth Embodiment)

Figure 14:
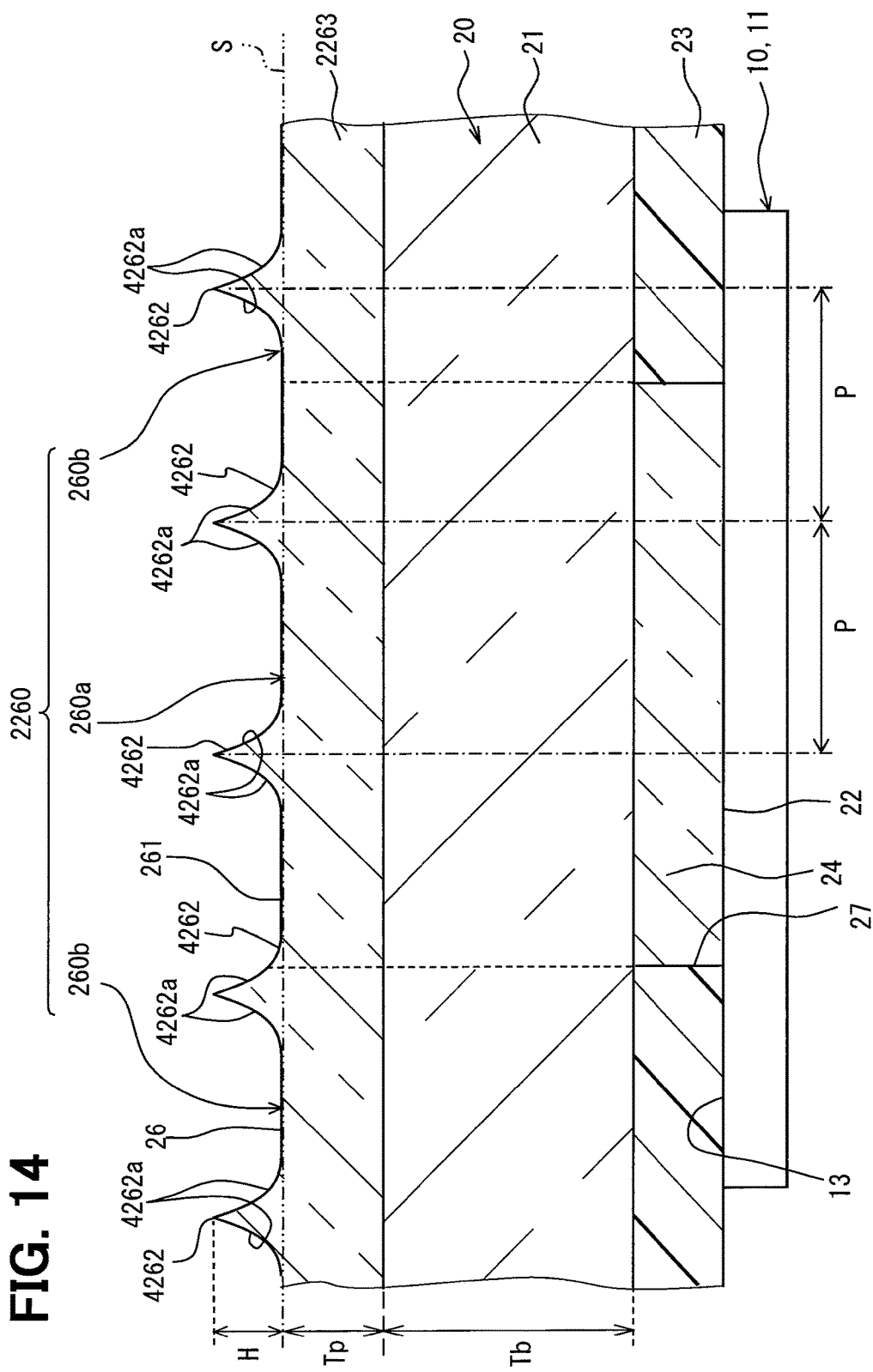
FIG. 14 is an enlarged cross-sectional view corresponding to FIG. 3 and illustrating a main part of a vehicle display device in accordance with a fourth embodiment.

As illustrated in FIG. 14, a fourth embodiment is a modification to the third embodiment. Each projecting surface part 4262 of the fourth embodiment ensures a lateral surface portion 4262*a* that is inclined in a curved shape relative to its surrounding planar part 261 to be directed toward the front side, more specifically, a lateral surface portion 4262*a* that is inclined in a curved recessed shape to be directed toward the front side.

In this fourth embodiment as well, the area occupancy of the planar part 261 at a transmission region 2260 is adjusted to be equal to or larger than the area occupancy of all the projecting surface parts 4262 at the transmission region 2260, similar to the first embodiment. Accordingly, in the fourth embodiment as well, the operation and effects described in the first and second embodiments can be produced similarly using the function of each projecting surface part 4262 including the lateral surface portion 4262*a* that is inclined in a curved shape relative to the planar part 261.

(Fifth Embodiment)

Figure 15:
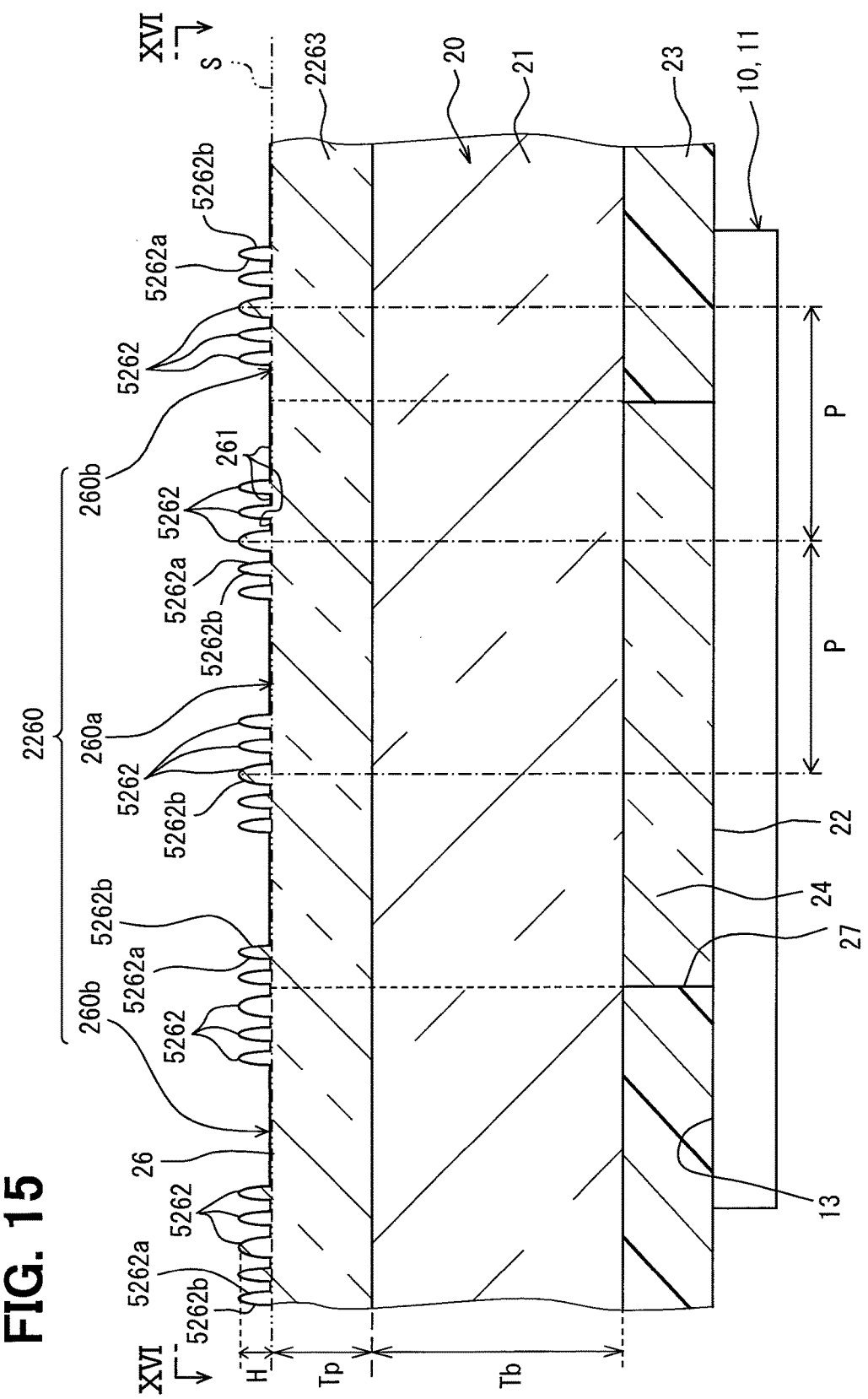
FIG. 15 is an enlarged cross-sectional view corresponding to FIG. 3 and illustrating a main part of a vehicle display device in accordance with a fifth embodiment.
Figure 16:
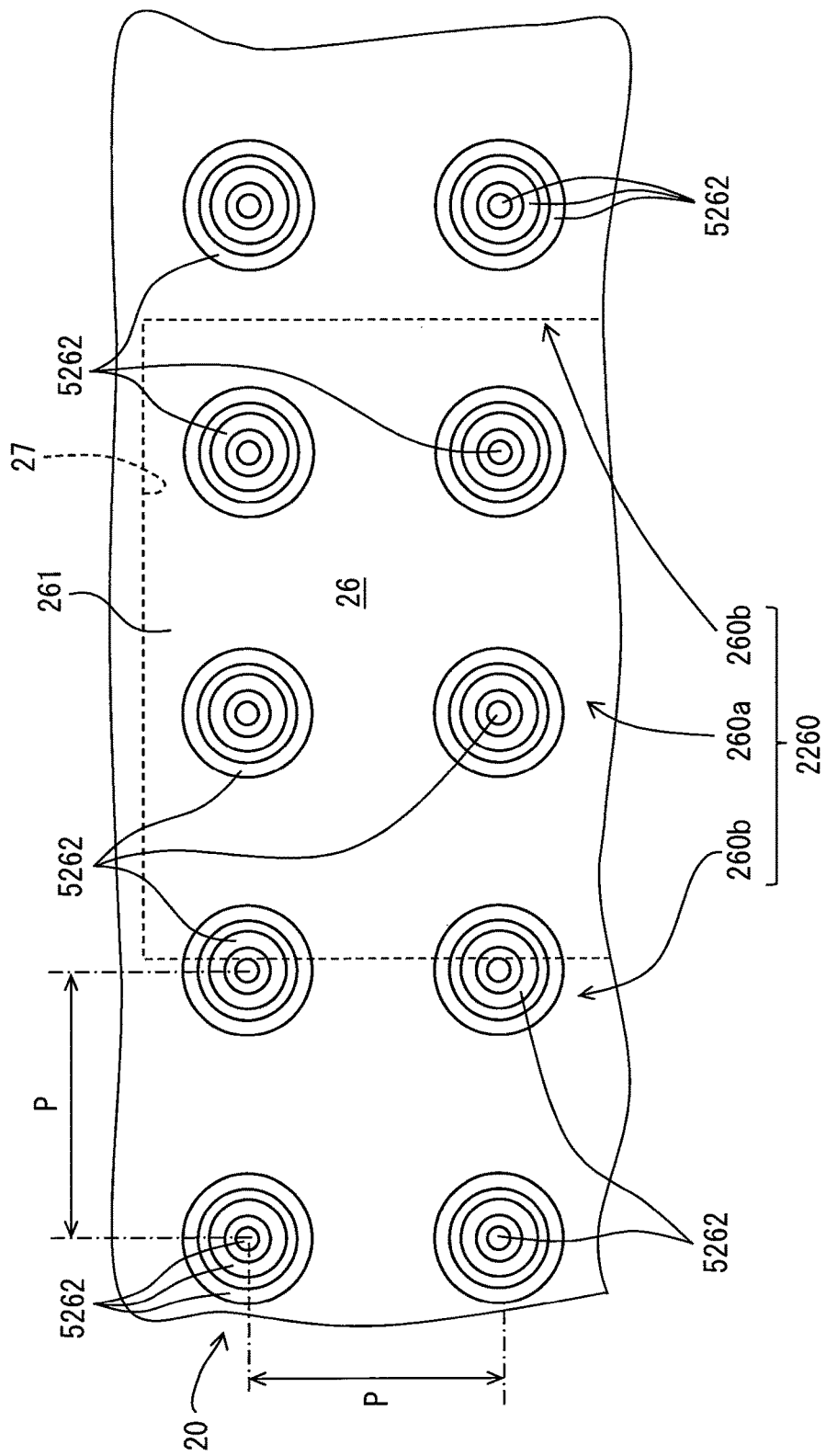
FIG. 16 is a diagram viewed from arrowed lines XVI-XVI in FIG. 15.

As illustrated in FIGS. 15 and 16, a fifth embodiment is a modification to the second embodiment. In the fifth embodiment, groups of projecting surface parts 5262 are provided at the positions with the constant pitch P corresponding to the projecting surface parts 2262 of the second embodiment. At any position, each projecting surface part 5262 is regarded as having such a form that the projecting surface part 2262 of the second embodiment is divided into a central columnar portion and its surrounding concentric circle annular portions and a planar part 261 is provided between these portions. An outer peripheral surface portion 5262*b* of the columnar projecting surface part 5262 is formed in a curved projecting surface shape that is inclined relative to its surrounding planar part 261 to be directed toward the front side. An inner peripheral surface portion 5262*a* and the outer peripheral surface portion 5262*b* of each annular projecting surface part 5262 are formed in a curved projecting surface shape that is inclined relative to the surrounding planar part 261 to be directed toward the front side. Specifically, the inclined mode of the peripheral surface portions 5262*a*, 5262*b* is a mode in which they are inclined in a curved tapered shape relative to the planar part 261.

In this fifth embodiment as well, the area occupancy of the planar part 261 at a transmission region 2260 is adjusted to be equal to or larger than the area occupancy of all the projecting surface parts 5262 at the transmission region 2260, similar to the first embodiment. Accordingly, in the fifth embodiment as well, the operation and effects described in the first and second embodiments can be produced similarly using the function of each projecting surface part 5262 having a curved projecting surface shape that includes the peripheral surface portions 5262a, 5262b which are inclined in a curved shape relative to the planar part 261. Although not shown, when a mode in which they are inclined in a planar shape relative to the planar part 261 is employed as the inclined mode of the peripheral surface portions 5262a, 5262b, the operation and effects described in the first and second embodiments can also be similarly produced.

(Sixth Embodiment)

Figure 17:
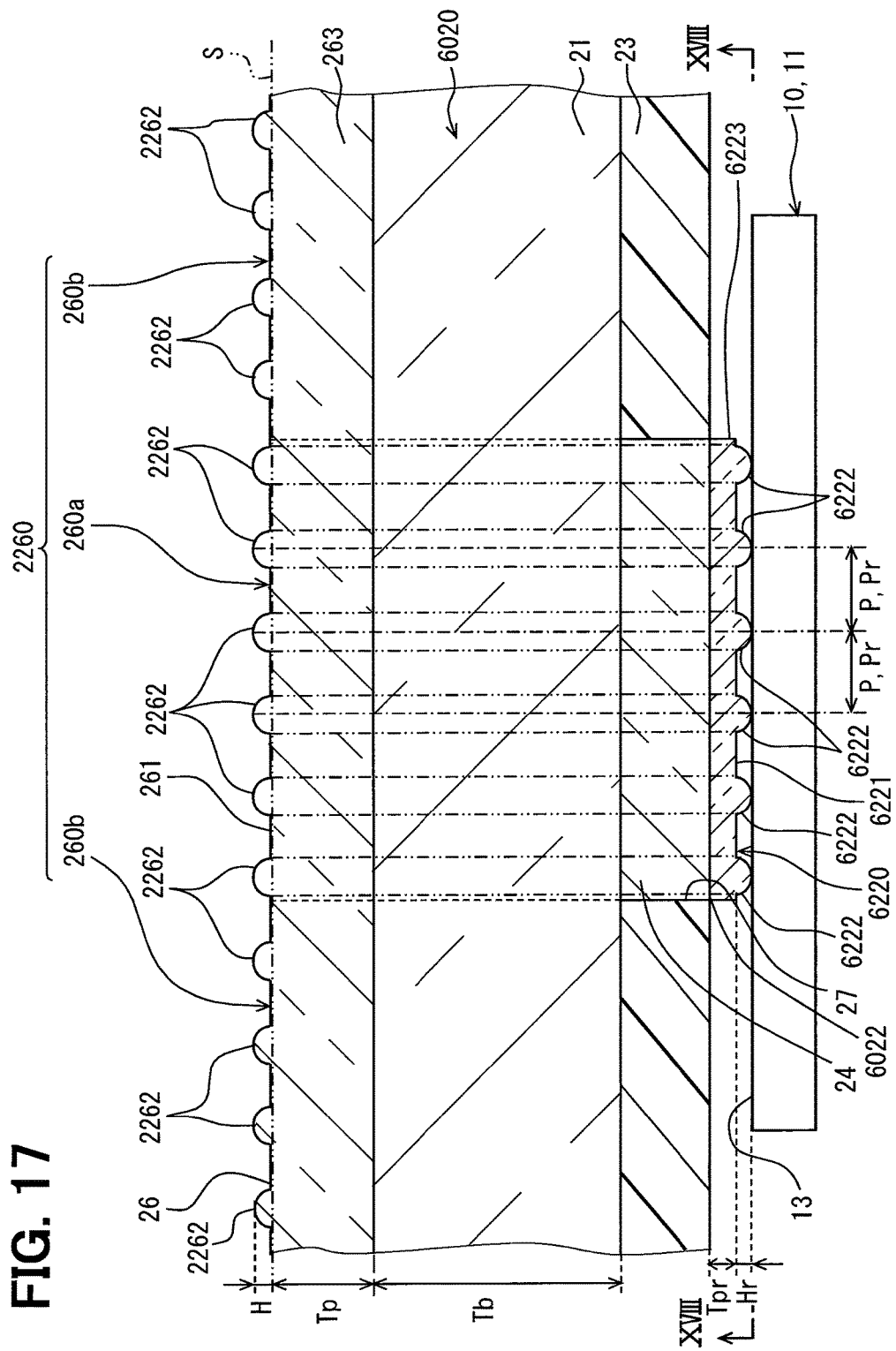
FIG. 17 is an enlarged cross-sectional view corresponding to FIG. 3 and illustrating a main part of a vehicle display device in accordance with a sixth embodiment.
Figure 18:
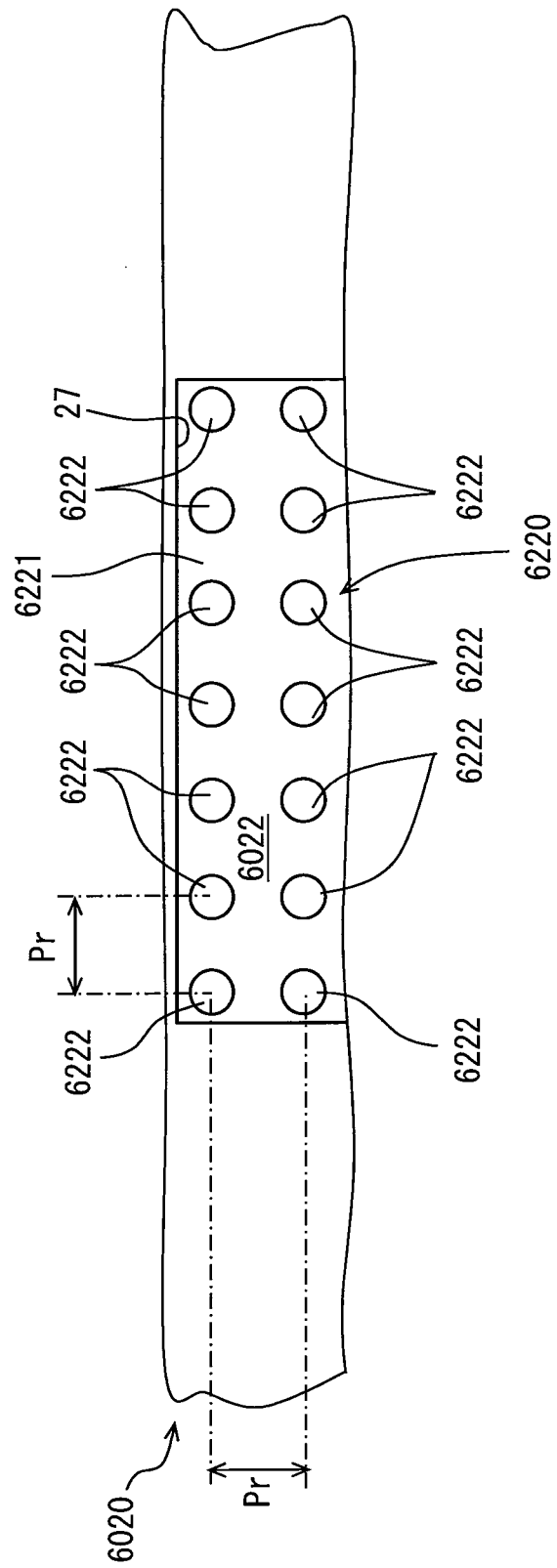
FIG. 18 is a diagram viewed from arrowed lines XVIII-XVIII in FIG. 17.

As illustrated in FIGS. 17 and 18, a sixth embodiment is a modification to the second embodiment. On a rear surface 6022 of a display panel 6020 of the sixth embodiment, there is provided a transmission region 6220 that is located on the rear side of a smoke part 24 corresponding to a transmitting window 27 and that is substantially not located on the rear side of a light shielding part 23. In the following description, the transmission region 6220 provided on the rear surface 6022 of the display panel 6020 is referred to as a "rear-surface transmission region 6220", and a transmission region 2260 provided on a front surface 26 of this display panel 6020 is distinctively referred to as a "front-surface transmission region 2260".

The rear-surface transmission region 6220 is occupied by a planar part 6221 and projecting surface parts 6222. In the following description, the planar part 6221 of the rear-surface transmission region 6220 is referred to as a "rear-surface planar part 6221", and a planar part 261 of the front-surface transmission region 2260 is distinctively referred to as a "front-surface planar part 261". Also, in the following description, the projecting surface part 6222 of the rear-surface transmission region 6220 is referred to as a "rear-surface projecting surface part 6222", and a projecting surface part 2262 of the front-surface transmission region 2260 is distinctively referred to as a "front-surface projecting surface part 2262".

Specifically, the rear-surface planar part 6221 is formed in a shape of a flat surface that is substantially parallel to a screen 13 of a display panel 11 located on the rear side of the rear-surface planar part 6221 along the screen 13. The rear-surface projecting surface part 6222 projects from its adjacent rear-surface planar part 6221 around the part 6222 toward the rear side. Each rear-surface projecting surface part 6222 is formed into a curved projecting surface shape such as a spherical surface shape or aspheric surface shape. As a result of such a shape, each rear-surface projecting surface part 6222 at nearly its entire part ensures a portion that is inclined in a curved shape relative to its surrounding rear-surface planar part 6221 to be directed toward the rear side, more specifically, a portion that is inclined in a curved projecting shape to be directed toward the rear side. The outline shape of each rear-surface projecting surface part 6222 viewed from the rear side may be a shape of a true circle as in FIG. 18 as a shape corresponding to the projecting surface part 2262, or may be a shape of an ellipse or another shape.

As illustrated in FIG. 17, the rear-surface planar part 6221 and each rear-surface projecting surface part 6222 are formed by a light transmitting layer 6223 which is stacked on a translucent substrate 21. Specifically, the rear-surface planar part 6221 is formed on the surface of the part of the light transmitting layer 6223 having substantially the same thickness Tpr. On the other hand, the rear-surface projecting surface parts 6222 are formed at the parts of the light transmitting layer 6223 having substantially the same projection height Hr in addition to the thickness Tpr. The thickness Tb of the translucent substrate 21 is set at a predetermined value, for example, from 300 μm to 1 mm, whereas the thickness Tpr of the light transmitting layer 6223 where the rear-surface planar part 6221 is formed is set at a predetermined value such as 5 μm. On the other hand, the projection height Hr of each rear-surface projecting surface part 6222 may be set at a predetermined value, for example, from 1 μm to 20 μm, particularly at a predetermined value from 1 μm to 10 μm.

At the rear-surface transmission region 6220, the rear-surface planar part 6221 is provided around the rear-surface projecting surface parts 6222 which are arranged side by side at a constant pitch Pr and each of which is provided correspondingly directly on the rear side of any one of the front-surface projecting surface parts 2262. Under this configuration, the pitch Pr of the rear-surface projecting surface parts 6222 at the entire rear-surface transmission region 6220 is set at substantially the same value as the pitch P of the front-surface projecting surface parts 2262. Accordingly, the rear-surface projecting surface parts 6222 are located respectively directly on the rear side of all the front-surface projecting surface parts 2262 one-to-one correspondingly. Additionally, the area in the outline of each rear-surface projecting surface part 6222 is set at substantially the same value as the area in the outline of its corresponding front-surface projecting surface part 2262. This is realized by the outline shape of each rear-surface projecting surface part 6222 viewed from the rear side substantially conforming with the outline shape of its corresponding front-surface projecting surface part 2262 viewed from the front side. Accordingly, at the rear-surface transmission region 6220, the ratio of the area occupancy of all the rear-surface projecting surface parts 6222 to the area occupancy of the rear-surface planar part 6221 is set at substantially the same value as the ratio of the area occupancy of all the front-surface projecting surface parts 2262 to the area occupancy of the front-surface planar part 261. Thus, at the rear-surface transmission region 6220 as well, the area occupancy of the rear-surface planar part 6221 is adjusted to be equal to or larger than the area occupancy of all the rear-surface projecting surface parts 6222.

As described above, the light transmitting layer 6223 on which the rear-surface projecting surface parts 6222 are provided with the constant pitch Pr and a predetermined area occupancy is formed by, for example, shape forming of the smoke part 24 or printing on the smoke part 24. Without forming such a light transmitting layer 6223, the rear-surface planar part 6221 and each rear-surface projecting surface part 6222 may be formed, for example, by performing grinding work or laser machining on the smoke part 24 or by forming simultaneously with the formation of the smoke part 24. In this case, the rear-surface transmission region 6220 which is occupied by the rear-surface planar part 6221 and each rear-surface projecting surface part 6222 is located inside the transmitting window 27 correspondingly to the transmitting window 27. Moreover, at least a part of the light transmitting layer 6223 may be formed inside the transmitting window 27. In such a case, the rear-surface transmission region 6220 which is occupied by the rear-surface planar part 6221 and each rear-surface projecting surface part 6222 is located inside the transmitting window 27 or on the rear side of the transmitting window 27 correspondingly to the transmitting window 27.

Figure 19:
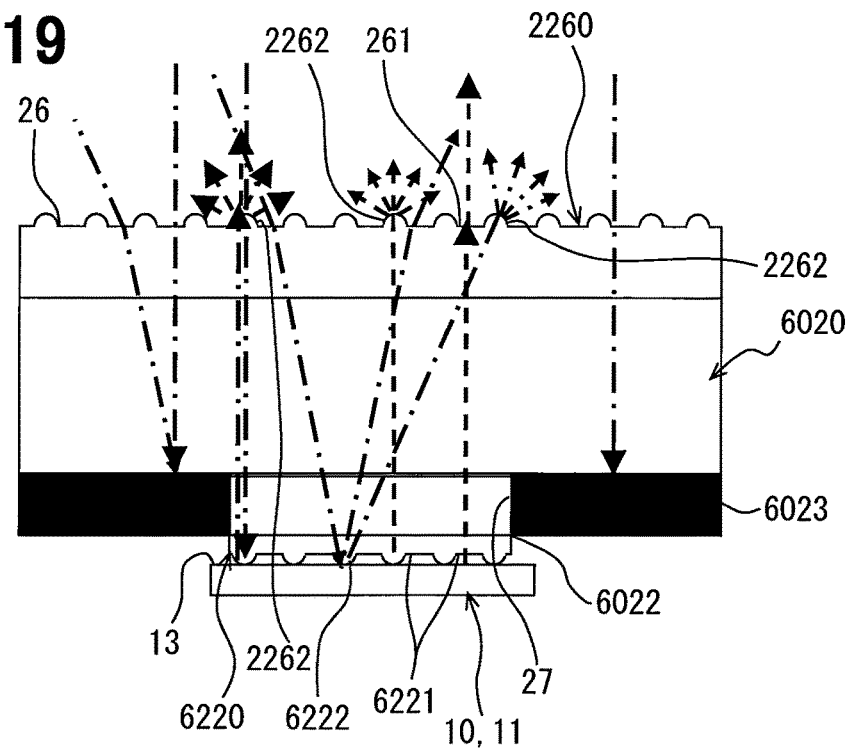
FIG. 19 is a schematic view illustrating characteristics of the sixth embodiment.
Figure 20:
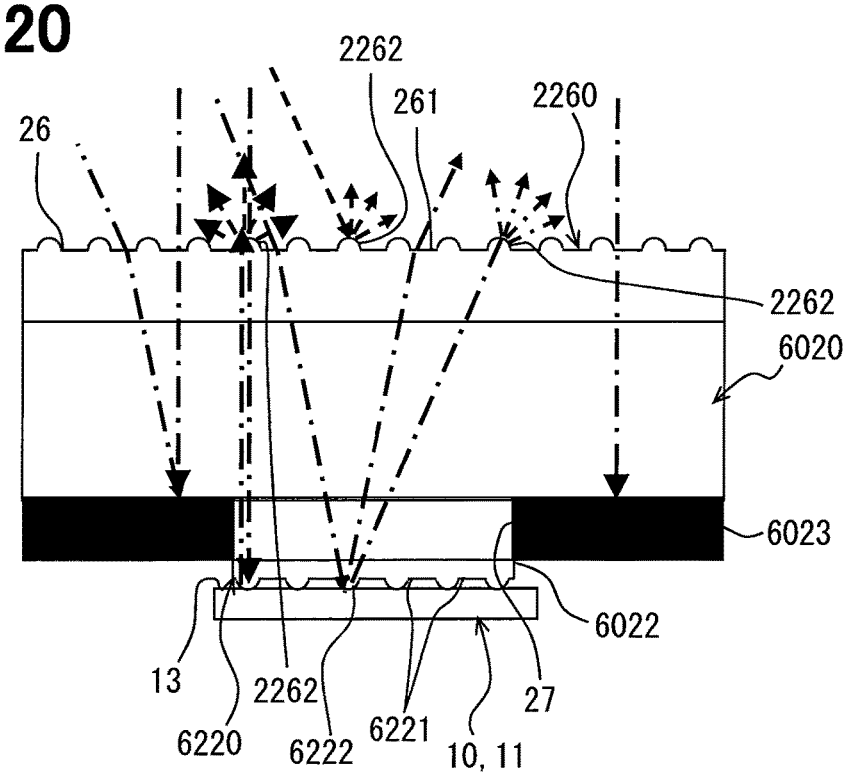
FIG. 20 is a schematic view illustrating the characteristics of the sixth embodiment.

As indicated by arrowed alternate long and short dash lines in FIGS. 19 and 20, both at the time of lighting and extinguishing of the backlight 12, the external light which has entered from the front side of the display panel 6020 through the front-surface transmission region 2260 into the transmitting window 27 enters further into the rear-surface transmission region 6220 through this transmitting window 27. In this case, the light entering into the rear-surface transmission region 6220 is diffused by each rear-surface projecting surface part 6222 having a curved projecting surface shape that includes a portion inclined in a curved shape relative to the rear-surface planar part 6221 having a flat surface shape. The external light transmitted through the rear-surface transmission region 6220, such as the external light diffused by each rear-surface projecting surface part 6222, is reflected by the screen 13, to enter again into the front-surface transmission region 2260 from the rear-surface transmission region 6220. In this case, the light which has entered obliquely into the front-surface transmission region 2260 is refracted by the front-surface planar part 261 having a flat surface shape, and is diffused by each front-surface projecting surface part 2262 having a curved projecting surface shape that includes a portion inclined in a curved shape relative to this front-surface planar part 261. Furthermore, as indicated by the arrowed alternate long and short dash lines in FIGS. 19 and 20, both at the time of lighting and extinguishing of the backlight 12, the external light entering from the front side of the display panel 6020 into the surrounding part of the transmitting window 27 is absorbed by a light shielding part 6023 which light-shields this surrounding part. As a result of these diffusion and absorption, the external light entering into the transmitting window 27 as well as the external light entering into the surrounding part of the transmitting window 27 have an increased degree of difficulty in returning to the front side. Accordingly, the visual recognition of the boundary between the transmitting window 27 and the light shielding part 6023 from the front side can be inhibited.

In addition, at the front-surface transmission region 2260, the area occupancy of the front-surface planar part 261 is adjusted to be equal to or larger than the area occupancy of all the front-surface projecting surface parts 2262. Moreover, at the rear-surface transmission region 6220, the rear-surface projecting surface parts 6222 are provided respectively directly on the rear side of all the front-surface projecting surface parts 2262 one-to-one correspondingly. As a result, the area occupancy of the rear-surface planar part 6221 is also adjusted to be equal to or larger than the area occupancy of all the rear-surface projecting surface parts 6222. Under such a configuration, as indicated by an arrowed short dashes line in FIG. 19, at the time of lighting of a backlight 12, the image light of a display image 14 entering from the rear side into the display panel 6020 is diffused by each projecting surface part 6222, 2262 having a curved projecting surface shape that includes a portion inclined in a curved shape relative to the planar part 6221 or 261. However, in this case, the image light of the display image 14 can be transmitted straight through each planar part 6221, 261 that has the area occupancy which is equal to or larger than the projecting surface parts 6222 or 2262 and that is along the screen 13, so as to be sharply visually-recognized. As indicated by an arrowed short dashes line in FIG. 20, at the time of extinguishing of the backlight 12, the external light which has entered from the front side into the display panel 6020 being turned into the irregular reflection light by each front-surface projecting surface part 2262 is reduced in accordance with the area occupancy of these front-surface projecting surface parts 2262 that is equal to or smaller than the front-surface planar part 261. Accordingly, the display panel 6020 can be inhibited from being visually recognized in white.

In addition to the above, the operation and effects described in the first and second embodiments can also be produced similarly by the sixth embodiment.

(Seventh Embodiment)

Figure 21:
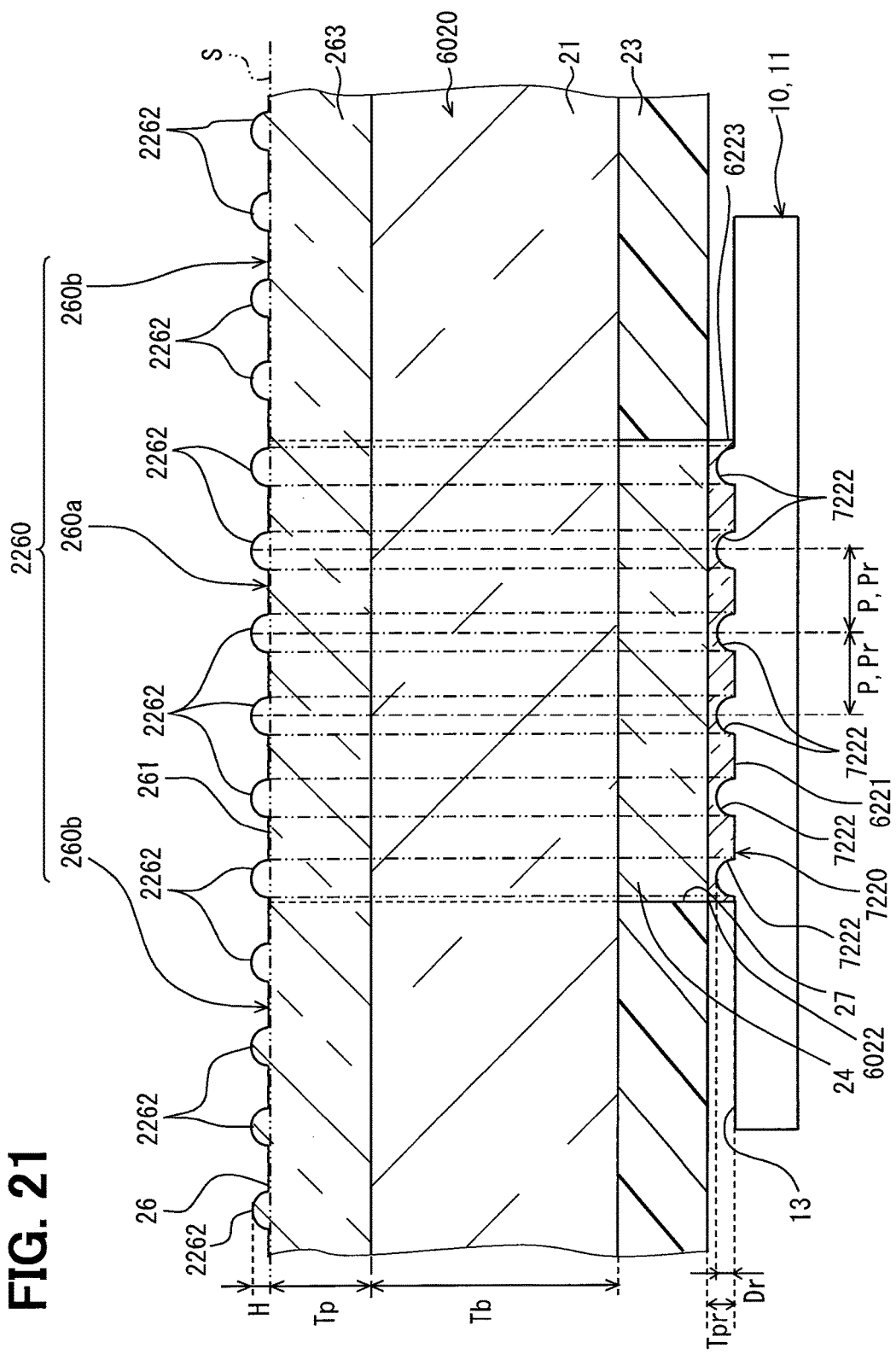
FIG. 21 is an enlarged cross-sectional view corresponding to FIG. 3 and illustrating a main part of a vehicle display device in accordance with a seventh embodiment.

As illustrated in FIG. 21, a seventh embodiment is a modification to the sixth embodiment. In the seventh embodiment, a rear-surface transmission region 7220 having substantially the same configuration as the rear-surface transmission region 6220 is provided, except that rear-surface recessed surface parts 7222 are arranged in place of the rear-surface projecting surface parts 6222. The rear-surface recessed surface parts 7222, which are arranged side by side at the constant pitch Pr that is substantially the same value as the pitch P of front-surface projecting surface parts 2262 and each of which is provided correspondingly directly on the rear side of any one of the front-surface projecting surface parts 2262, are recessed toward the front side from an adjacent rear-surface planar part 6221 around the rear-surface recessed surface parts 7222. The recess depth Dr of each rear-surface recessed surface part 7222 may be set at a predetermined value, for example, from 1 μm to 20 μm, particularly at a predetermined value from 1 μm to 10 μm.

Each rear-surface recessed surface part 7222 is formed in a curved recessed surface shape such as a spherical surface shape or aspheric surface shape. As a result of such a shape, each rear-surface recessed surface part 7222 at nearly its entire part ensures a portion that is inclined in a curved shape relative to its surrounding rear-surface planar part 6221 to be directed toward the rear side, more specifically, a portion that is inclined in a curved recessed shape to be directed toward the rear side. The outline shape of each rear-surface recessed surface part 7222 viewed from the rear side, although not shown because of a shape corresponding to the projecting surface part 2262, may also be a shape of a true circle, or may also be a shape of an ellipse or another shape.

In addition, the rear-surface recessed surface parts 7222 are located with the constant pitch Pr respectively directly on the rear side of all the front-surface projecting surface parts 2262 one-to-one correspondingly. Furthermore, the area in the outline of each rear-surface recessed surface part 7222 is set at substantially the same value as the area in the outline of its corresponding front-surface projecting surface part 2262. Accordingly, at the rear-surface transmission region 7220, the ratio of the area occupancy of all the rear-surface recessed surface parts 7222 to the area occupancy of the rear-surface planar part 6221 is set at substantially the same value as the ratio of the area occupancy of all the front-surface projecting surface parts 2262 to the area occupancy of a front-surface planar part 261. Thus, in the case of the rear-surface transmission region 7220, the area occupancy of the rear-surface planar part 6221 is adjusted to be equal to or larger than the area occupancy of all the rear-surface recessed surface parts 7222.

As a result, in the seventh embodiment, the operation and effects described in the first, second and sixth embodiments can be similarly produced using the function of each rear-surface recessed surface part 7222 that includes a portion inclined in a curved shape relative to the rear-surface planar part 6221.

First to thirteenth modifications to the above-described embodiments will be described. The embodiments have been described above. The present disclosure is not interpreted by limiting to these embodiments, and can be applied to various embodiments and their combination without departing from the scope of the disclosure.

Specifically, in the first modification to the first to the fifth embodiments, a space part may be ensured inside the transmitting window 27 without providing the smoke part 24 inside the transmitting window 27. In the second modification to the first to seventh embodiments, the projecting surface parts 262, 2262, 3262, 4262, 5262 may not be provided at the second front surface region 260*b* on the front surface 26 of the display panel 20, 6020, and only the first front surface region 260*a* may be the "transmission region" occupied by the planar part 261 and the projecting surface parts 262, 2262, 3262, 4262, 5262.

In the third modification to the first to seventh embodiments, instead of, or, in addition to providing the display design 25 which is luminously displayed by its reflection or transmission of light source light at the light shielding part 23 around the transmitting window 27, the display design 25 may be formed, for example, at the second front surface region 260*b* on the display panel front surface 26. In the fourth modification to the first to seventh embodiments, various display panels 11 other than a TFT liquid crystal panel, such as an organic EL panel, may be employed.

Figure 22:
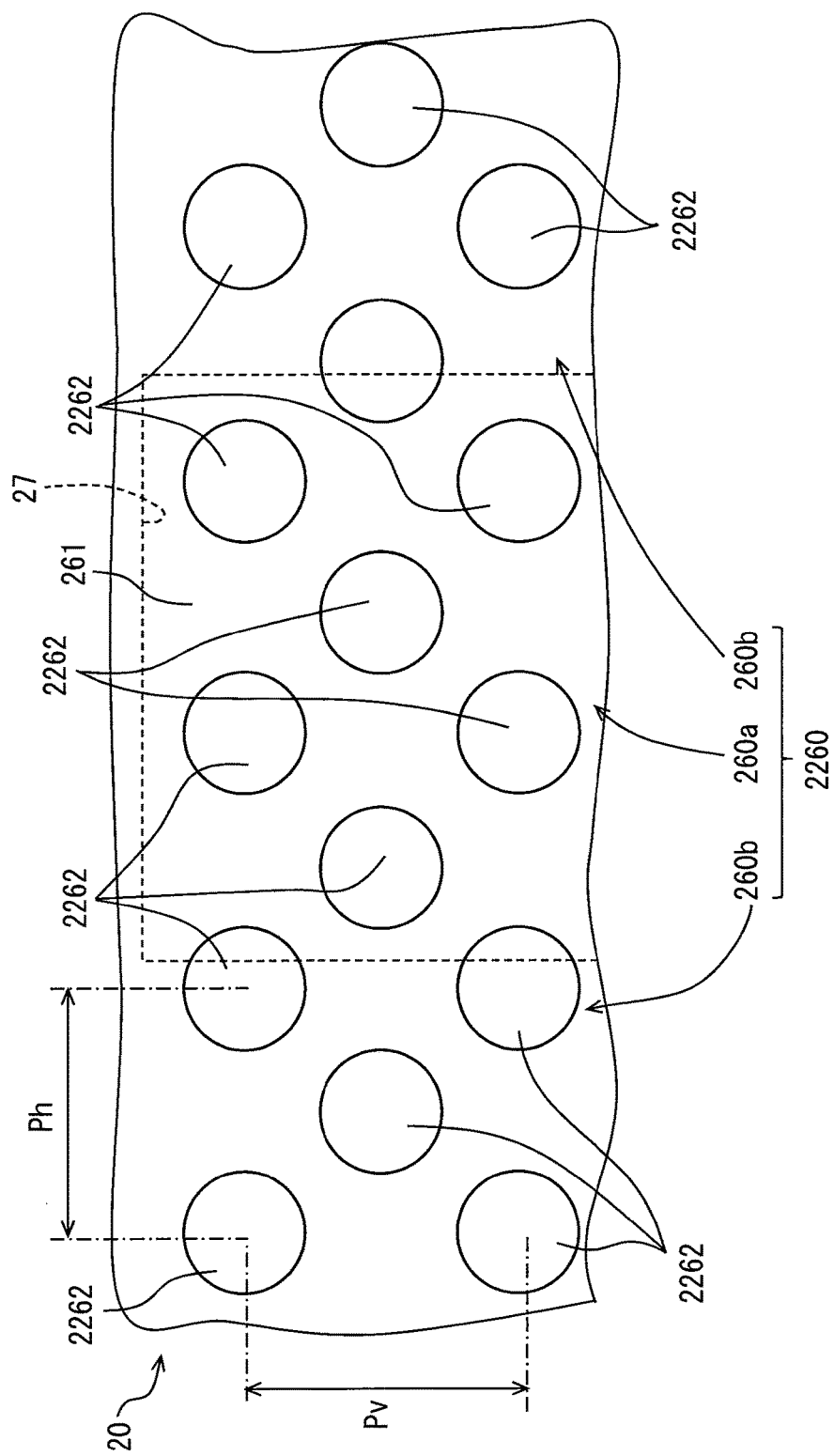
FIG. 22 is a sectional view illustrating a modification to FIG. 11.

In the fifth modification to the second to fourth, sixth, and seventh embodiments, there may be employed a configuration whereby the projecting surface parts 2262, 3262, 4262 are arranged side by side regularly at the constant pitch P at a part of the transmission region 2260 and whereby this pitch P is made irregular at the remaining part of the transmission region 2260. In the sixth modification to the third, fourth, sixth, and seventh embodiments, there may be employed a configuration whereby the projecting surface parts 3262, 4262 are arranged side by side at an irregular pitch in conformity with the first embodiment. In the seventh modification to the second to fourth, sixth, and seventh embodiments, there may be employed a configuration whereby the projecting surface parts 2262, 3262, 4262 are arranged side by side regularly at more than one type of pitch in at least a part of the transmission region 2260. In this case, for example, as illustrated in FIG. 22, a pitch Ph in the horizontal direction (right-left direction in FIG. 22) and a pitch Pv in the vertical direction may be different from each other in the vehicle on a horizontal surface. In FIG. 22, in the crossing directions that respectively make a predetermined angle relative to the horizontal direction, the pitches are set at substantially the same value. FIG. 22 illustrates the seventh modification to the second embodiment.

Figure 23:
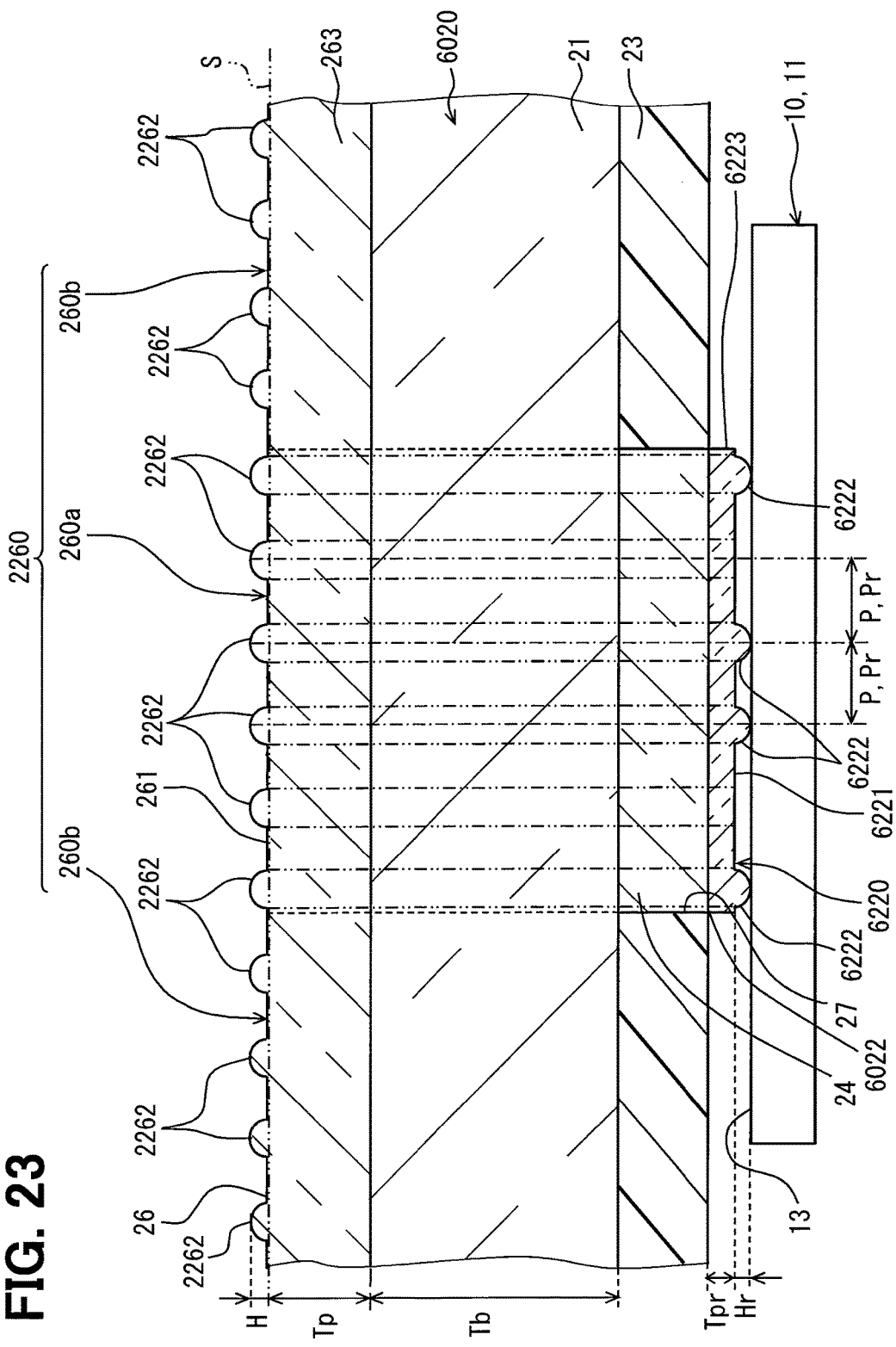
FIG. 23 is a cross-sectional view illustrating a modification to FIG. 17.

In the eighth modification to the sixth and seventh embodiments, the pitch in conformity with the first embodiment or the fifth to seventh modifications may be employed for the rear-surface projecting surface parts 6222 or the rear-surface recessed surface parts 7222 as long as they are provided correspondingly directly on the rear side of the front-surface projecting surface parts 2262. In the ninth modification to the sixth and seventh embodiments, as illustrated in FIG. 23, there may be employed a configuration whereby the rear-surface projecting surface parts 6222 or the rear-surface recessed surface parts 7222 are not provided directly on the rear side of a predetermined number of the front-surface projecting surface parts 2262 of all the front-surface projecting surface parts 2262. FIG. 23 illustrates the ninth modification to the sixth embodiment.

Figure 24:
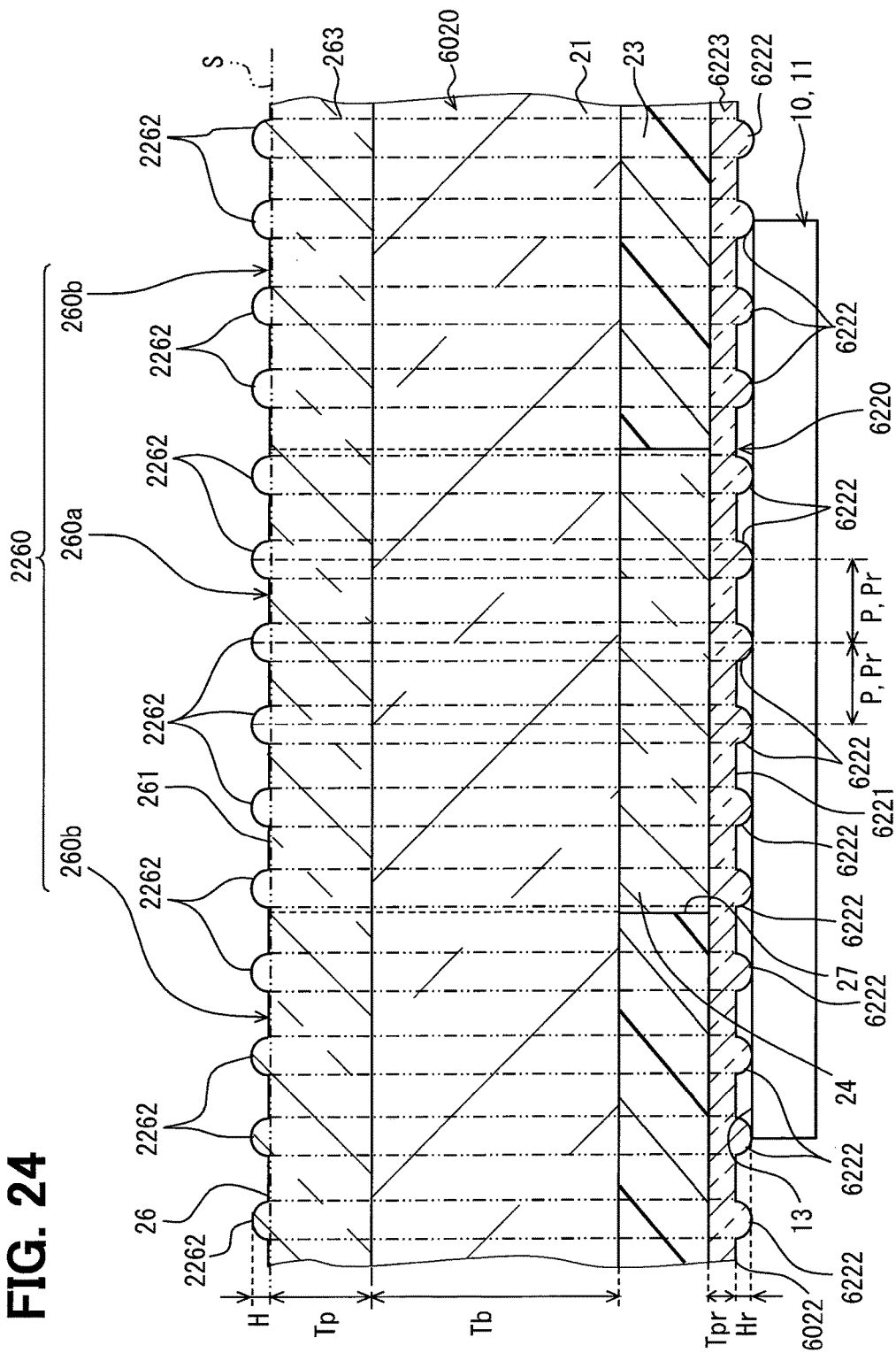
FIG. 24 is a cross-sectional view illustrating a modification to FIG. 17.

In the tenth modification to the sixth and seventh embodiments, the area in the outline of each rear-surface recessed surface part 7222 may be set to be smaller than the area in the outline of its corresponding front-surface projecting surface part 2262. In the eleventh modification to the sixth and seventh embodiments, as illustrated in FIG. 24, the transmission region 6220, 7220 may also be provided on the rear surface 6022 of the display panel 6020 on the rear side of the light shielding part 23. FIG. 24 illustrates the eleventh modification to the sixth embodiment.

Figure 25:
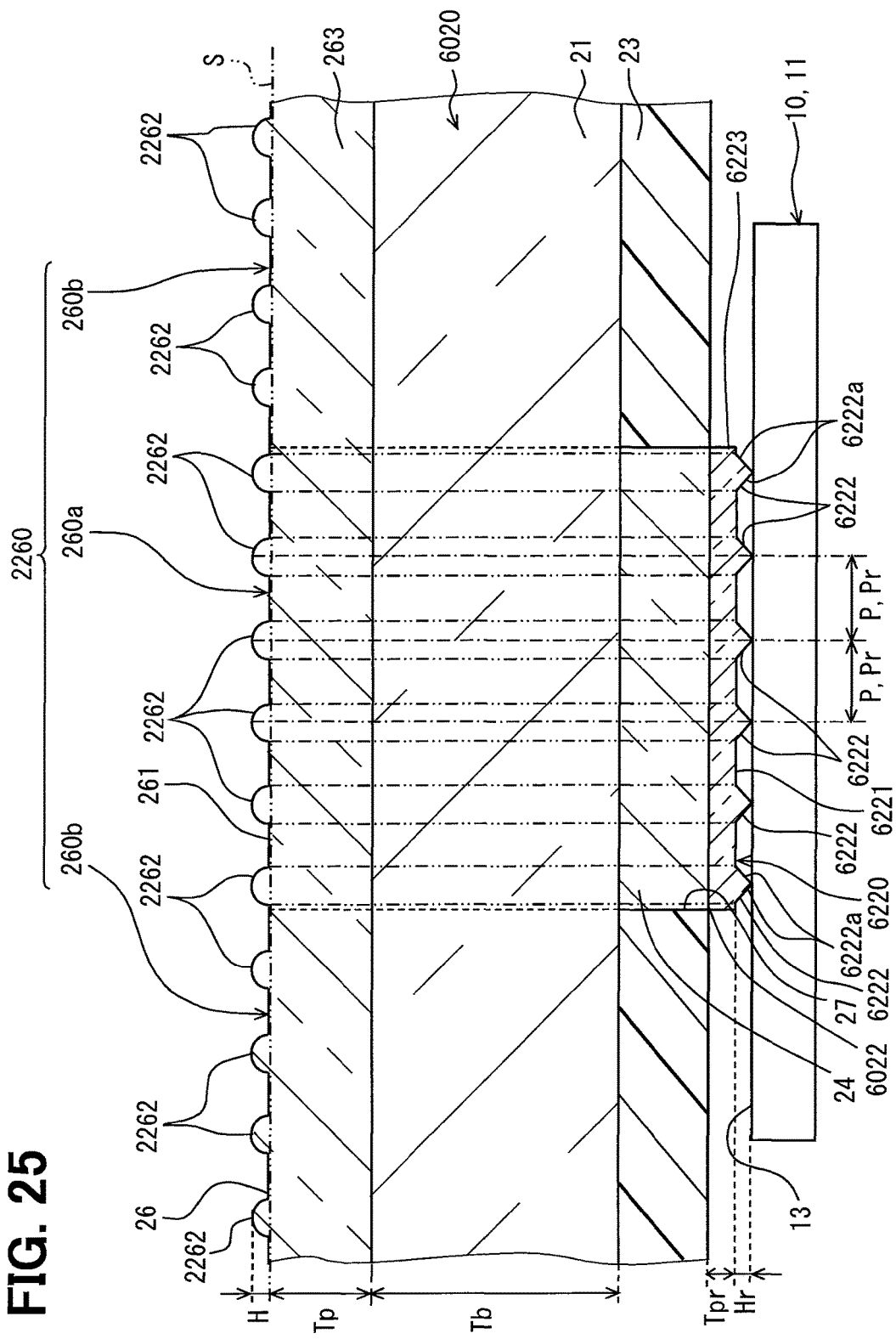
FIG. 25 is a cross-sectional view illustrating a modification to FIG. 17.

In the twelfth modification to the sixth embodiment, for a mode in which the rear-surface projecting surface parts 6222 are inclined relative to the rear-surface planar part 6221, there may be employed a mode in which they are inclined in a planar shape or curved shape to be directed toward the front side similar to any of the third to fifth embodiments. FIG. 25 illustrates the twelfth modification to the sixth embodiment with respect to a mode in which a lateral surface portion 6222*a* having a flat surface shape is inclined similar to the third embodiment. In the case of this twelfth modification, as long as the rear-surface projecting surface parts 6222 are provided correspondingly directly on the rear side of the front-surface projecting surface parts 2262, the outline shapes of these corresponding components 2262, 6222 may be different from, or substantially the same as each other.

Figure 26:
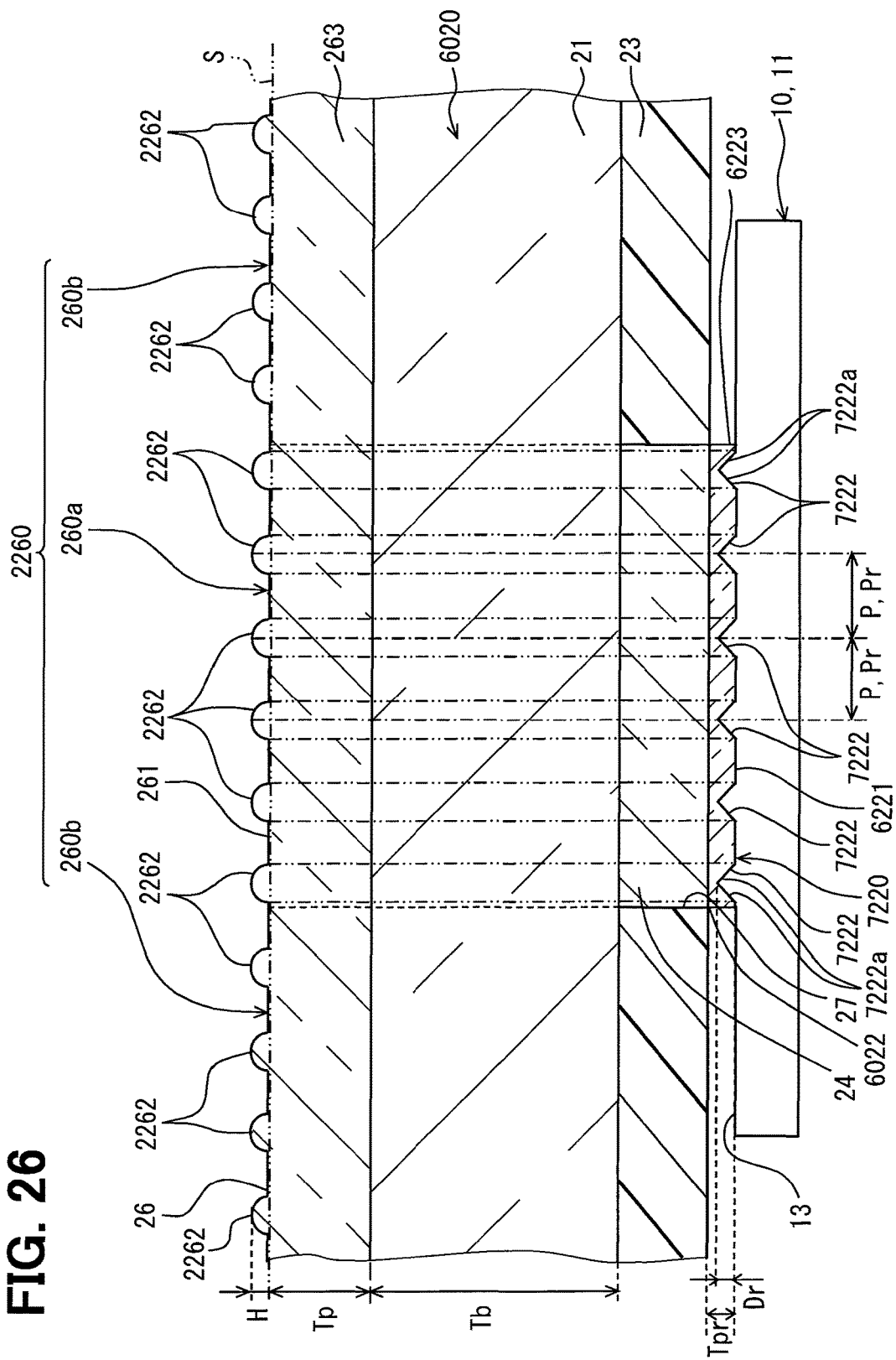
FIG. 26 is a cross-sectional view illustrating a modification to FIG. 21.

In the thirteenth modification to the seventh embodiment, for a mode in which the rear-surface recessed surface parts 7222 are inclined relative to the rear-surface planar part 6221, there may be employed a mode in which they are inclined in a planar shape or curved shape to be directed toward the rear side in conformity with any of the third to fifth embodiments. FIG. 26 illustrates the thirteenth modification to the seventh embodiment with respect to a mode in which an inner surface portion 7222*a* having a flat surface shape is inclined in conformity with the third embodiment. In the case of this thirteenth modification, as long as the rear-surface recessed surface parts 7222 are provided correspondingly directly on the rear side of the front-surface projecting surface parts 2262, the outline shapes of these corresponding components 2262, 7222 may be different from, or substantially the same as each other.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicle display device comprising:
    an indicator that luminously displays a display image on its screen by lighting and stops the luminous display of the display image by extinction; and
    a display panel that includes a light shielding part on a rear surface of the display panel, wherein:
    the light shielding part light-shields a surrounding part of a transmitting window through which an image light of the display image is transmitted to be capable of being visually recognized from a front side;
    a transmission region of a front surface of the display panel that is located at least on the front side of the transmitting window is occupied by:
        a planar part that is formed in a flat surface shape along the screen; and a plurality of projecting surface parts that project from the planar part in a curved projecting surface shape, the plurality of projecting surface parts are provided side by side at a constant pitch in at least a part of the transmission region, each of the plurality of projecting surface parts includes:
   a columnar portion at its center; and
   a plurality of concentric circle annular portions around the columnar portion, the planar part is located among the columnar portion and the plurality of concentric circle annular portions; and
an area occupancy of the planar part at the transmission region is adjusted to be equal to or larger than an area occupancy of all the plurality of projecting surface parts at the transmission region.

2. A vehicle display device comprising:
an indicator that luminously displays a display image on its screen by lighting and stops the luminous display of the display image by extinction; and
a display panel that includes a light shielding part on a rear surface of the display panel, wherein:
the light shielding part light-shields a surrounding part of a transmitting window through which an image light of the display image is transmitted to be capable of being visually recognized from a front side;
a transmission region of a front surface of the display panel that is located at least on the front side of the transmitting window is occupied by:
   a planar part that is formed in a flat surface shape along the screen; and
   a plurality of projecting surface parts that project from the planar part, the plurality of projecting surface parts are provided side by side at a constant pitch in at least a part of the transmission region;
each of the plurality of projecting surface parts includes a portion that is inclined in a planar shape relative to the planar part and that is directed to the front side, and is formed into a pyramidal surface shape that is pointed toward the front side and into a polygonal pyramid surface shape whose outline shape viewed from the front side is a polygonal shape; and
an area occupancy of the planar part at the transmission region is adjusted to be equal to or larger than an area occupancy of all the plurality of projecting surface parts at the transmission region.

3. The vehicle display device according to claim 1, further comprising a semitransparent darkly-colored smoke part which is formed inside the transmitting window and through which the image light is transmitted, wherein the light shielding part, which is non-transparent and darkly-colored, light-shields a surrounding part of the smoke part.

4. The vehicle display device according to claim 1, wherein:
the light shielding part defines a display design around the transmitting window; and
light source light is transmitted through the display design, so that the display design is luminously displayed to be capable of being visually recognized from the front side.

5. The vehicle display device according to claim 1, wherein:
a front-surface transmission region serving as the transmission region is occupied by:
   a front-surface planar part serving as the planar part; and
   a plurality of front-surface projecting surface parts serving as the plurality of projecting surface parts;
at least a rear-surface transmission region of the rear surface that is located corresponding to the transmitting window is occupied by:
   a rear-surface planar part that is formed in a flat surface shape along the screen; and
   a plurality of rear-surface projecting surface parts that project from the rear-surface planar part;
each of the plurality of rear-surface projecting surface parts includes a portion that is inclined in a curved shape or planar shape relative to the rear-surface planar part; and
each of the plurality of rear-surface projecting surface parts is provided correspondingly directly on a rear side of any one of the plurality of front-surface projecting surface parts.

6. The vehicle display device according to claim 5, wherein the plurality of rear-surface projecting surface parts are provided respectively directly on the rear side of all the plurality of front-surface projecting surface parts one-to-one correspondingly.

7. The vehicle display device according to claim 1, wherein:
a front-surface transmission region serving as the transmission region is occupied by:
   a front-surface planar part serving as the planar part; and
   a plurality of front-surface projecting surface parts serving as the plurality of projecting surface parts;
at least a rear-surface transmission region of the rear surface that is located corresponding to the transmitting window is occupied by:
   a rear-surface planar part that is formed in a flat surface shape along the screen; and
   a plurality of rear-surface recessed surface parts that are recessed from the rear-surface planar part;
each of the plurality of rear-surface recessed surface parts includes a portion that is inclined in a curved shape or planar shape relative to the rear-surface planar part; and
each of the plurality of rear-surface recessed surface parts is provided correspondingly directly on a rear side of any one of the plurality of front-surface projecting surface parts.

8. The vehicle display device according to claim 7, wherein the plurality of rear-surface recessed surface parts are provided respectively directly on the rear side of all the plurality of front-surface projecting surface parts one-to-one correspondingly.

9. The vehicle display device according to claim 2, further comprising a semitransparent darkly-colored smoke part which is formed inside the transmitting window and through which the image light is transmitted, wherein the light shielding part, which is non-transparent and darkly-colored, light-shields a surrounding part of the smoke part.

10. The vehicle display device according to claim 2, wherein:
the light shielding part defines a display design around the transmitting window; and
light source light is transmitted through the display design, so that the display design is luminously displayed to be capable of being visually recognized from the front side.

11. The vehicle display device according to claim 2, wherein:
a front-surface transmission region serving as the transmission region is occupied by:
   a front-surface planar part serving as the planar part; and a plurality of front-surface projecting surface parts serving as the plurality of projecting surface parts;

at least a rear-surface transmission region of the rear surface that is located corresponding to the transmitting window is occupied by:

a rear-surface planar part that is formed in a flat surface shape along the screen; and a plurality of rear-surface projecting surface parts that project from the rear-surface planar part;

each of the plurality of rear-surface projecting surface parts includes a portion that is inclined in a curved shape or planar shape relative to the rear-surface planar part; and each of the plurality of rear-surface projecting surface parts is provided correspondingly directly on a rear side of any one of the plurality of front-surface projecting surface parts.

12. The vehicle display device according to claim 5, wherein the plurality of rear-surface projecting surface parts are provided respectively directly on the rear side of all the plurality of front-surface projecting surface parts one-to-one correspondingly.

13. The vehicle display device according to claim 2, wherein:

a front-surface transmission region serving as the transmission region is occupied by:

a front-surface planar part serving as the planar part; and a plurality of front-surface projecting surface parts serving as the plurality of projecting surface parts;

at least a rear-surface transmission region of the rear surface that is located corresponding to the transmitting window is occupied by:

a rear-surface planar part that is formed in a flat surface shape along the screen; and a plurality of rear-surface recessed surface parts that are recessed from the rear-surface planar part;

each of the plurality of rear-surface recessed surface parts includes a portion that is inclined in a curved shape or planar shape relative to the rear-surface planar part; and each of the plurality of rear-surface recessed surface parts is provided correspondingly directly on a rear side of any one of the plurality of front-surface projecting surface parts.

14. The vehicle display device according to claim 7, wherein the plurality of rear-surface recessed surface parts are provided respectively directly on the rear side of all the plurality of front-surface projecting surface parts one-to-one correspondingly.

\* \* \* \* \*